United States Patent
Kasahara et al.

(10) Patent No.: US 8,108,660 B2
(45) Date of Patent: Jan. 31, 2012

(54) MULTIPROCESSOR SYSTEM AND METHOD OF SYNCHRONIZATION FOR MULTIPROCESSOR SYSTEM

(75) Inventors: Hironori Kasahara, Tokyo (JP); Keiji Kimura, Tokyo (JP); Masayuki Ito, Tokyo (JP); Tatsuya Kamei, Tokyo (JP); Toshihiro Hattori, Tokyo (JP)

(73) Assignees: Renesas Electronics Corporation, Kawasaki-shi (JP); Waseda University, Tokyo (JP)

( * ) Notice: Subject to any disclaimer, the term of this patent is extended or adjusted under 35 U.S.C. 154(b) by 384 days.

(21) Appl. No.: 12/358,233

(22) Filed: Jan. 22, 2009

(65) Prior Publication Data

US 2009/0193228 A1    Jul. 30, 2009

(30) Foreign Application Priority Data

Jan. 25, 2008   (JP) .................................. 2008-15028

(51) Int. Cl.
*G06F 1/04* (2006.01)
(52) U.S. Cl. ........................................ 712/225; 709/248
(58) Field of Classification Search .................. None
See application file for complete search history.

(56) References Cited

U.S. PATENT DOCUMENTS

| | | | | |
|---|---|---|---|---|
| 5,127,092 A * | 6/1992 | Gupta et al. | .................. | 712/234 |
| 5,434,995 A * | 7/1995 | Oberlin et al. | ................ | 713/375 |
| 5,684,947 A * | 11/1997 | Horie | .............................. | 714/37 |
| 5,768,538 A * | 6/1998 | Badovinatz et al. | .......... | 709/248 |
| 5,787,301 A * | 7/1998 | Arakawa et al. | ................ | 712/20 |
| 6,216,174 B1 * | 4/2001 | Scott et al. | ..................... | 713/375 |
| 6,263,406 B1 * | 7/2001 | Uwano et al. | .................. | 711/141 |
| 6,353,622 B1 * | 3/2002 | Homer et al. | ................. | 370/507 |
| 6,466,988 B1 * | 10/2002 | Sukegawa et al. | ............ | 709/248 |
| 2005/0055594 A1 * | 3/2005 | Doering et al. | ............... | 713/375 |
| 2006/0212868 A1 * | 9/2006 | Takayama et al. | ............ | 718/100 |
| 2006/0225074 A1 * | 10/2006 | Vaid et al. | ..................... | 718/102 |
| 2008/0022142 A1 * | 1/2008 | Nishioka | ....................... | 713/375 |

FOREIGN PATENT DOCUMENTS

| | | |
|---|---|---|
| JP | 2-105961 A | 4/1990 |
| JP | 10-91591 A | 4/1998 |
| JP | 2000-305919 A | 11/2000 |
| JP | 2005-071109 A | 3/2005 |
| JP | 2006-259821 A | 9/2006 |

OTHER PUBLICATIONS

Carl J. Beckmann et al., "Faster Barrier Synchronization hardware", Proceedings of Supercomputer '90, Nov. 1990, p. 180-189.

* cited by examiner

*Primary Examiner* — Eric Coleman
(74) *Attorney, Agent, or Firm* — Miles & Stockbridge P.C.

(57) ABSTRACT

Each of processors has a barrier write register and a barrier read register. Each barrier write register is wired to each barrier read register by a dedicated wiring block. For example, a 1-bit barrier write register of a processor is connected, via the wiring block, to a first bit of each 8-bit barrier read register contained in the processors, and a 1-bit barrier write register of another processor is connected, via a wiring block, to a second bit of each 8-bit barrier read register contained in the processors. For example, a processor writes information to its own barrier write register, thereby notifying synchronization stand-by to the other processors and reads its own barrier read register, thereby recognizing whether the other processors are in synchronization stand-by or not. Therefore, a special dedicated instruction is not required along barrier synchronization processing, and the processing can be made at a high speed.

23 Claims, 22 Drawing Sheets

CPU#0

```
ver = ver ^ 1;
while (r1 ^ ver != 0)
    ;
r0 = ver;
```

CPU#1

```
ver = ver ^ 1;
r1 = ver;
while (r0 ^ ver != 0)
    ;
```

MULTIPROCESSOR SYSTEM AND METHOD OF SYNCHRONIZATION FOR MULTIPROCESSOR SYSTEM

CROSS-REFERENCE TO RELATED APPLICATION

The present application claims priority from Japanese Patent Application No. JP 2008-015028 filed on Jan. 25, 2008, the content of which is hereby incorporated by reference into this application.

TECHNICAL FIELD OF THE INVENTION

The present invention relates to a multiprocessor system and a method of synchronization of the same. More particularly, the present invention relates to a technique effectively applied to a multiprocessor system that carries out barrier synchronization processing by hardware and a method of synchronization for the same.

BACKGROUND OF THE INVENTION

For example, Japanese Patent Application Laid-Open Publication No. H02-105961 (Patent Document 1) describes a method of carrying out synchronization between processors in a multiprocessor system having "N" number of processors connected to a system bus, which is provided with a broadcasting function, via a bus interface. Specifically, each of the processors has an N-bit synchronization register in which bits correspond to the N number of processors, respectively. Each of the processors sets '1' to the corresponding bit of the synchronization register when a phase of its own is completed and also sends notifications to the other processors via the system bus, and the other processors update the synchronization registers in response to the notifications. Consequently, the processors can carry out synchronization processing when all the bits of the synchronization registers are recognized to be '1'.

Japanese Patent Application Laid-Open Publication No. H10-091591 (Patent Document 2) describes a method of carrying out a barrier synchronization between clusters by providing an inter-cluster communication register among the plurality of clusters each of which including a plurality of processors. In the inter-cluster communication register, a cluster number is set and each representative processor present in each cluster decrements the cluster number by one, and barrier synchronization processing is completed at the point when the cluster number becomes 0.

Japanese Patent Application Laid-Open Publication No. 2000-305919 (Patent Document 3) and Japanese Patent Application Laid-Open Publication No. 2005-071109 (Patent Document 4) describe methods of carrying out a software synchronization by providing synchronization flag regions corresponding to processors, respectively, in a shared memory of a multiprocessor system. Furthermore, Japanese Patent Application Laid-Open Publication No. 2006-259821 (Patent Document 5) describes a multiprocessor system having caches in hierarchical structure with a method of carrying out synchronization by utilizing the caches of hierarchical structure. Specifically, for example, a primary cache is provided in each of CPU0 and CPU1 in a processor module, and a common secondary cache is provided in an upper level of the two primary caches; in this case, the synchronization of a plurality of threads executed by CPU0 is carried out by flag variables reserved in the primary caches, and CPU0 and CPU1 are synchronized by a flag variable reserved in the secondary cache.

In addition, "Fast barrier synchronization hardware", C. J. Beckmann, C. D. Polychronopoulos, Proceedings of Supercomputing '90, November 1990, p. 180-189 (Non-Patent Document 1) describes a configuration comprising one P-bit register which is provided commonly to P number of processors, a detection circuit which detects the situation that all the values of the P-bit register become zero and transmits detection signals thereof to the P processors, etc. When barrier synchronization is to be carried out after parallel processing is executed by the P processors, each of the processors writes zero to the corresponding bit of the P-bit register at the point when the processing of the processor of its own is finished. When processings of all the processors are completed, detection signals are transmitted to all the processors, thereby enabling barrier synchronization. Note that, Non-Patent Document 1 also shows a configuration in which a register array comprising (P-1) number of sets of P-bit registers is provided in order to process multiple loops by parallel processing.

SUMMARY OF THE INVENTION

In recent years, because of problems of leakage current, power consumption, etc. caused along with miniaturization and speed increase of semiconductor chips, multiprocessor (or multi-core) techniques have been used as a performance improving measure that takes the place of improvement of the operating frequencies. In a multiprocessor system, normally, one processing content called a task, process, etc. is divided into a plurality of processing units called threads, etc., and the plurality of threads are arbitrarily allocated to processors, thereby executing parallel processing by the plurality of processors. Therefore, between the plurality of threads, dependence relationships are created, for example, in the manner that the processing result of a certain thread is used by another thread and further processed. Consequently, so-called barrier synchronization in which the plurality of processors carrying out mutually dependent processing rendezvous at a synchronization point is required.

Such barrier synchronization can be realized either by hardware or software. For example, in abovedescribed Patent Document 3, Patent Document 4 and Patent Document 5, there are described methods of realizing barrier synchronization by software. In the methods by software, basically, flag variables are set in a memory that is shared by processors. Each of the processors updates and references the flag variables when the processing of its own is completed, thereby recognizing whether the processings of the other processors have been finished or not.

However, in the methods by software, time is consumed to complete the barrier synchronization since the processors access the shared flag variables in the shared memory. In other words, in addition to simple memory access time, arbitration time to be taken until the right to access the shared memory is obtained is also additionally required. For example, as shown in Patent Document 5, when the flag variables are reserved in specified cache memories, the speed can be increased by some degree; however, for example, if means of specifying the cache memories is required or a write-back occurs, the speed is lowered; therefore, special cache memory control or the like is conceivably required.

Meanwhile, for example, in the abovedescribed Japanese Patent Document 1, Patent Document 2 and Non-Patent Document 1, methods of realizing barrier synchronization by hardware are described. In the methods of Patent Document 2 and Non-Patent Document 1, basically, a common flag register is provided with respect to a plurality of processors, and barrier synchronization is carried out by write and reference to the flag register. In this case, since the access to the flag register has to be exclusively controlled, this process may consume time. On the other hand, in the method of Patent Document 1, each processor has the abovedescribed flag register, and the coherency of the flag registers is maintained via the common system bus. However, when the system bus is used, arbitration time for ensuring the right to access the bus is required; therefore, it becomes difficult to carry out high-speed barrier synchronization processing.

The present invention has been made in view of the foregoing, and it is an object of the present invention to provide a multiprocessor system and a method of synchronization of the same capable of realizing highly-efficient barrier synchronization processing. The above and other objects and novel characteristics of the present invention will be apparent from the description of the present specification and the accompanying drawings.

The typical ones of the inventions disclosed in the present application will be briefly described as follows.

A multiprocessor system according to an embodiment of the present invention has: N (N≧2) processors; N barrier write registers (first registers) and N barrier read registers (second registers) provided in the N processors, respectively; and a first means. When any processor among the N processors writes first information to the barrier write register provided in the processor along with barrier synchronization, the first means transmits the first information to the barrier read register(s) provided in the other processor(s). The first means is realized by, for example, a wiring block directly wiring the N barrier write registers to the N barrier read registers.

When such a configuration is used, the first information can be promptly reflected to the barrier read register(s) of the other processor(s) when a certain processor writes the first information, which indicates that the processor is waiting for own synchronization, to the barrier write register of its own. Therefore, each of the other processor(s) is capable of promptly understanding whether the processor(s) other than itself is waiting for synchronization or not by reading the barrier read register of its own; therefore, high-speed barrier synchronization processing can be realized. In this process, the speed can be increased when the information transmission from the barrier write register to the barrier read register is carried out by using a dedicated wiring block without the intermediation of a system bus.

In addition, the processor is supposed to write the first information to the barrier write register of its own for notifying that the processor is waiting for synchronization to the other processor(s), and the processor is supposed to read the barrier read register of its own for understanding the synchronization stand-by state of the other processor(s); therefore, special instruction sets are not required to be added to the CPUs, and barrier synchronization processing can be realized at low cost. Furthermore, when the processor(s) other than its own writes the first information to the barrier write register, the first information is configured to be directly reflected to the barrier read register in the processor itself instead of an indirect mode such as interruption; therefore, the process currently carried out by the processor itself is not disturbed along with the reflection. Thus, a highly-efficient barrier synchronization processing can be realized.

Moreover, the multiprocessor system of an embodiment of the present invention has a plurality of sets of the abovedescribed barrier write registers and barrier read registers in each of the processors. Consequently, for example when processing contents including barrier synchronization processing of a plurality of layers are to be carried out, each set can be allocated to each layer, and such barrier synchronization processing can be readily realized.

Furthermore, in the multiprocessor system of an embodiment of the present invention, the abovedescribed barrier write register has a plurality of bits. Consequently, a plurality of types of synchronization points can be set as version numbers, thereby flexibly handling advanced or complex barrier synchronization processing. For example, each layer of abovedescribed plurality of layers can be allocated to each bit of the plurality of bits of the barrier write register. When a plurality of sets of the barrier write registers and barrier read registers are provided as described above, and, in addition, when the abovedescribed version numbers are used in combination, further advanced or complex barrier synchronization processing can be flexibly handled.

The effects obtained by typical aspects of the present invention will be briefly described below.

When a multiprocessor system according to an embodiment of the present invention is used, highly-efficient barrier synchronization processing can be realized.

BRIEF DESCRIPTIONS OF THE DRAWINGS

FIG. 14 is an explanatory diagram showing still another example of an operation of the multiprocessor system of FIG. 11;

FIG. 19 is an explanatory diagram showing an example of detailed source codes used in the barrier synchronization processing in the operation example of FIG. 18;

DESCRIPTIONS OF THE PREFERRED EMBODIMENTS

Hereinafter, embodiments of the present invention will be described in detail with reference to the accompanying drawings. Note that, components having the same function are denoted by the same reference symbols throughout the drawings for describing the embodiment, and the repetitive description thereof will be omitted. In addition, in the embodiments described below, the invention will be described in a plurality of sections or embodiments when required as a matter of convenience. However, these sections or embodiments are not irrelevant to each other unless otherwise stated, and the one relates to the entire or a part of the other as a modification example, details, or a supplementary explanation thereof.

Also, in the embodiments described below, when referring to the number of elements (including number of pieces, values, amount, range, and the like), the number of the elements is not limited to a specific number unless otherwise stated or except the case where the number is apparently limited to a specific number in principle. The number larger or smaller than the specified number is also applicable. Further, in the embodiments described below, it goes without saying that the components (including element steps) are not always indispensable unless otherwise stated or except the case where the components are apparently indispensable in principle. Similarly, in the embodiments described below, when the shape of the components, positional relation thereof, and the like are mentioned, the substantially approximate and similar shapes and the like are included therein unless otherwise stated or except the case where it can be conceived that they are apparently excluded in principle. The same goes for the numerical value and the range described above.

First Embodiment

Figure 1:
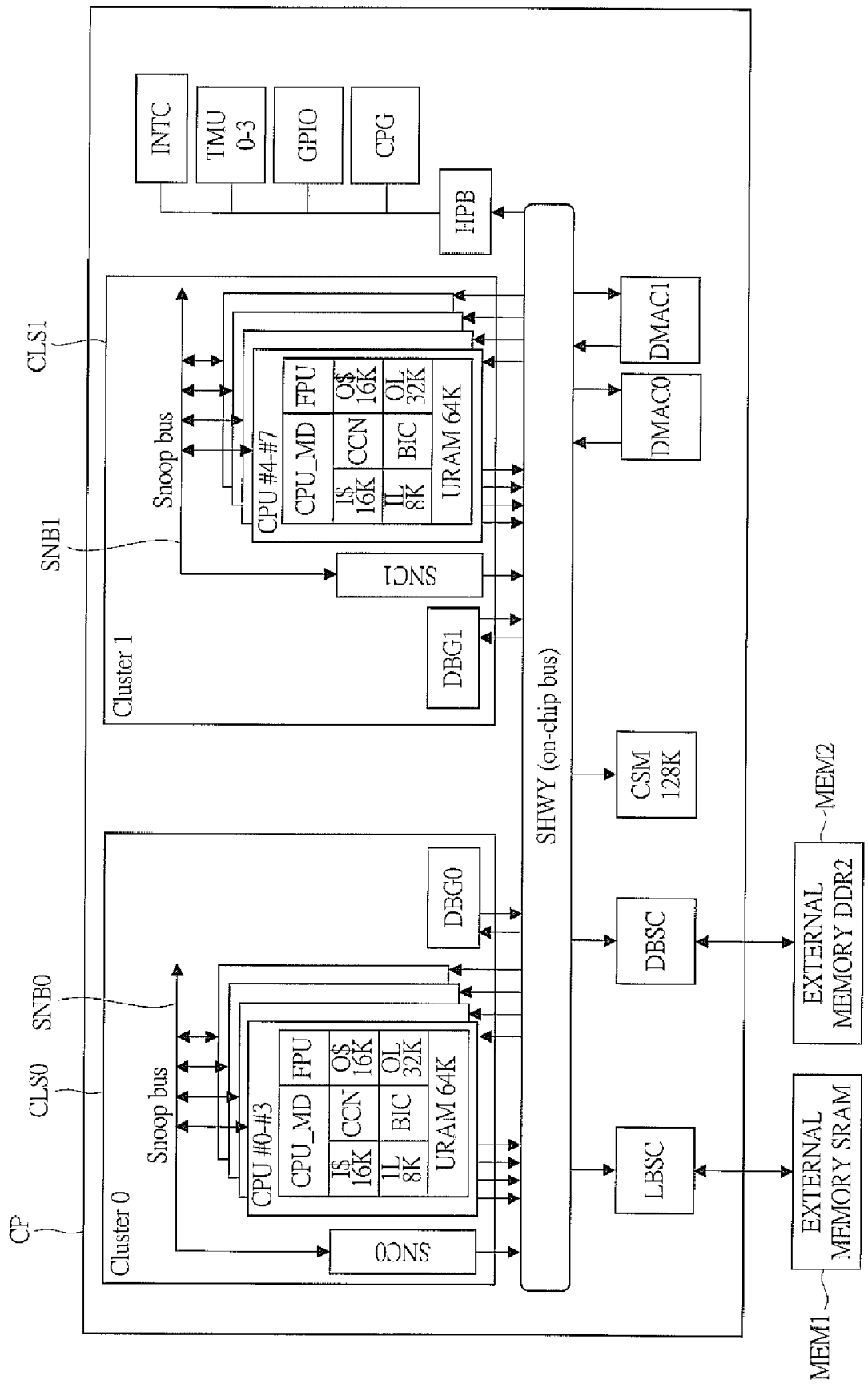
FIG. 1 is a block diagram showing an example of an entire configuration of a multiprocessor system according to a first embodiment of the present invention.

FIG. 1 is a block diagram showing an example of an entire configuration of a multiprocessor system according to a first embodiment of the present invention. The multiprocessor system shown in FIG. 1 has, for example, a semiconductor chip CP including processors, etc., an external memory MEM1 such as an SRAM (Static Random Access Memory), and an external memory MEM2 such as a DDR2-SDRAM (Double Data Rate 2 Synchronous Dynamic Random Access Memory). The semiconductor chip CP is, though not particularly limited to this, formed on a semiconductor substrate of, for example, silicon, by a publicly-known CMOS fabrication method.

The semiconductor chip CP contains, though not particularly limited to this, a system bus SHWY. To the SHWY, a plurality of (herein, two) clusters CLS0 and CLS1, memory controllers LBSC and DBSC, a shared memory CSM, DMA (Direct Memory Access) controllers DMAC0 and DMAC1, a peripheral bus bridge HPB, etc. are connected. On the other side of HPB, a clock generating unit CPG, a universal IO interface unit GPIO, timer units TMU0 to TMU3, an interrupt controller INTC, etc. are connected. The memory controller LBSC controls the external memory (SRAM) MEM1, and the memory controller DBSC controls the external memory (DDR2-SDRAM) MEM2. Note that, "cluster" conceptually means an individual system unit distributed by so-called clustering, and is generally used from the viewpoint of reliability and high-speed performance.

The cluster CLS0 contains a snoop bus SNB0 and a snoop bus controller SNC0 which controls the snoop bus. A plurality of (herein, four) processors (CPUs: Central Processing Units) CPU#0 to CPU#3 are connected to the snoop bus SNB0. SNB0 and SNC0 monitor the updating operations, etc. of cache memories contained in the CPUs CPU#0 to CPU#3 and carry out control so that coherency of the cache memories can be maintained among the CPUs CPU#0 to CPU#3. In this manner, the speed of the entire system can be increased by controlling the coherency of the cache memories without the intermediation of the system bus SHWY. The cluster CLS0 also contains a debug controller DBG0 etc.

Each of the CPUs CPU#0 to CPU#3 contains a CPU module CPU_MD, a floating-point-number calculating unit FPU, a cache controller CCN, a system-bus interface BIC, a user memory URAM, local memories IL and OL, primary cache memories I$ and O$, etc. Each of the CPUs CPU#0 to CPU#3 carries out desired processing while using the primary cache memories I$ and O$ of its own as lowest-level memories. In this process, when write back or the like with respect to an upper-level memory happens, accesses to the external memories MEM1, MEM2, etc. via SHWY are generated. Note that, although merely the primary cache memories are simply shown herein, as a matter of course, a secondary cache memory etc. to be shared by the CPUs CPU#0 to CPU#3 may be provided in the cluster CLS0.

The cluster CLS1 has a similar configuration as the cluster CLS0. More specifically, the cluster CLS1 contains a snoop bus SNB1 and a snoop bus controller SNC1, and a plurality of (herein, four) processors CPU CPU#4 to CPU#7 are connected to SNB1. Also, the cluster CLS1 contains a debug controller DBG1 etc. Since the configurations of the interiors of the CPUs CPU#4 to CPU#7 are similar to the case of the cluster CLS0, detailed descriptions thereof will be omitted. While the configuration example of the multiprocessor (multi-core) system of 4 CPUs×2 clusters has been shown herein, as a matter of course, the number of the CPUs in the clusters, the number of the clusters, etc. can be suitably modified.

Figure 2:
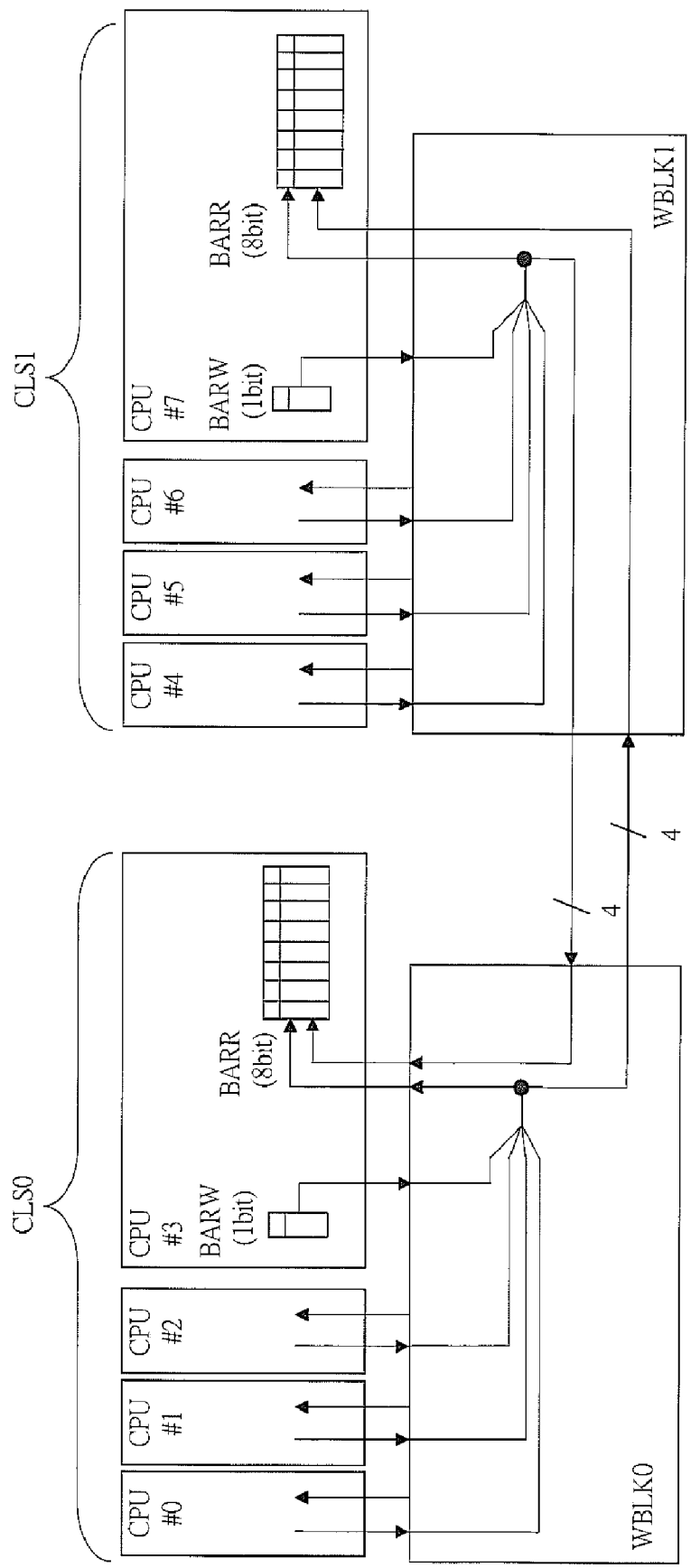
FIG. 2 is a schematic diagram showing a configuration example of a main part of the multiprocessor system according to the first embodiment of the present invention.

FIG. 2 is a schematic diagram showing a configuration example of a main part of the multiprocessor system according to the first embodiment of the present invention. The multiprocessor system shown in FIG. 2 has wiring blocks WBLK0 and WBLK1 in addition to the cluster CLS0 comprising the processors CPU CPU#0 to CPU#3 and the cluster CLS1 comprising the processors CPU#4 to CPU#7 shown in FIG. 1. Each of the CPUs CPU#0 to CPU#7 has a 1-bit barrier write register BARW (first register) and a barrier read register BARR (second register) having the number of bits (herein, 8 bits) corresponding to the number of CPUs (herein, eight). Note that, in FIG. 2, CPU#0, CPU#1, and CPU#2 have a same configuration with CPU#3; and CPU#4, CPU#5, and CPU#6 have a same configuration with CPU#7.

The wiring block WBLK0 connects the wiring (corresponding to 4 bits) from each BARW contained in the CPUs CPU#0 to CPU#3 in CLS0 to particular 4 bits (for example, bits [0] to [3]) in each BARR contained in each of the CPUs CPU#0 to CPU#3 respectively by broadcasting, and also extends the wiring from BARW toward the wiring block WBLK1. Similarly, the wiring block WBLK1 connects the wiring (corresponding to 4 bits) from each BARW contained in the CPUs CPU#4 to CPU#7 in CLS1 to particular 4 bits (for example, bits [4] to [7]) in each BARR contained in each of the CPUs CPU#4 to CPU#7 respectively by broadcasting, and also extends the wiring from BARW toward the wiring block WBLK0. In addition, WBLK0 connects the wiring (corresponding to 4 bits) extended from WBLK1 to the remaining 4 bits (for example, bits [4] to [7]) in each BARR contained in each of the CPUs CPU#0 to CPU#3 respectively by broadcasting. Similarly, WBLK1 connects the wiring (corresponding to 4 bits) extended from WBLK0 to the remaining 4 bits (for example, bit [0] to [3]) in each BARR contained in each of the CPUs CPU#4 to CPU#7 respectively by broadcasting.

Therefore, for example, when the CPU CPU#0 writes information to BARW of its own, the written information is concurrently reflected to a particular 1 bit (for example, bit [0]) in each BARR contained in each of the CPUs CPU#0 to CPU#7 via the wiring blocks WBLK0 and WBLK1. Meanwhile, for example, when the CPU CPU#7 writes information to BARW of its own, the written information is concurrently reflected to a particular 1 bit (for example, bit [7]) in each BARR contained in each of the CPUs CPU#0 to CPU#7 via the wiring blocks WBLK0 and WBLK1. Note that, WBLK0 is formed in the snoop bus controller SNC0 in FIG. 1, and WBLK1 is formed in the snoop bus controller SNC1; however, the formation positions thereof are not particularly limited.

Figure 3:
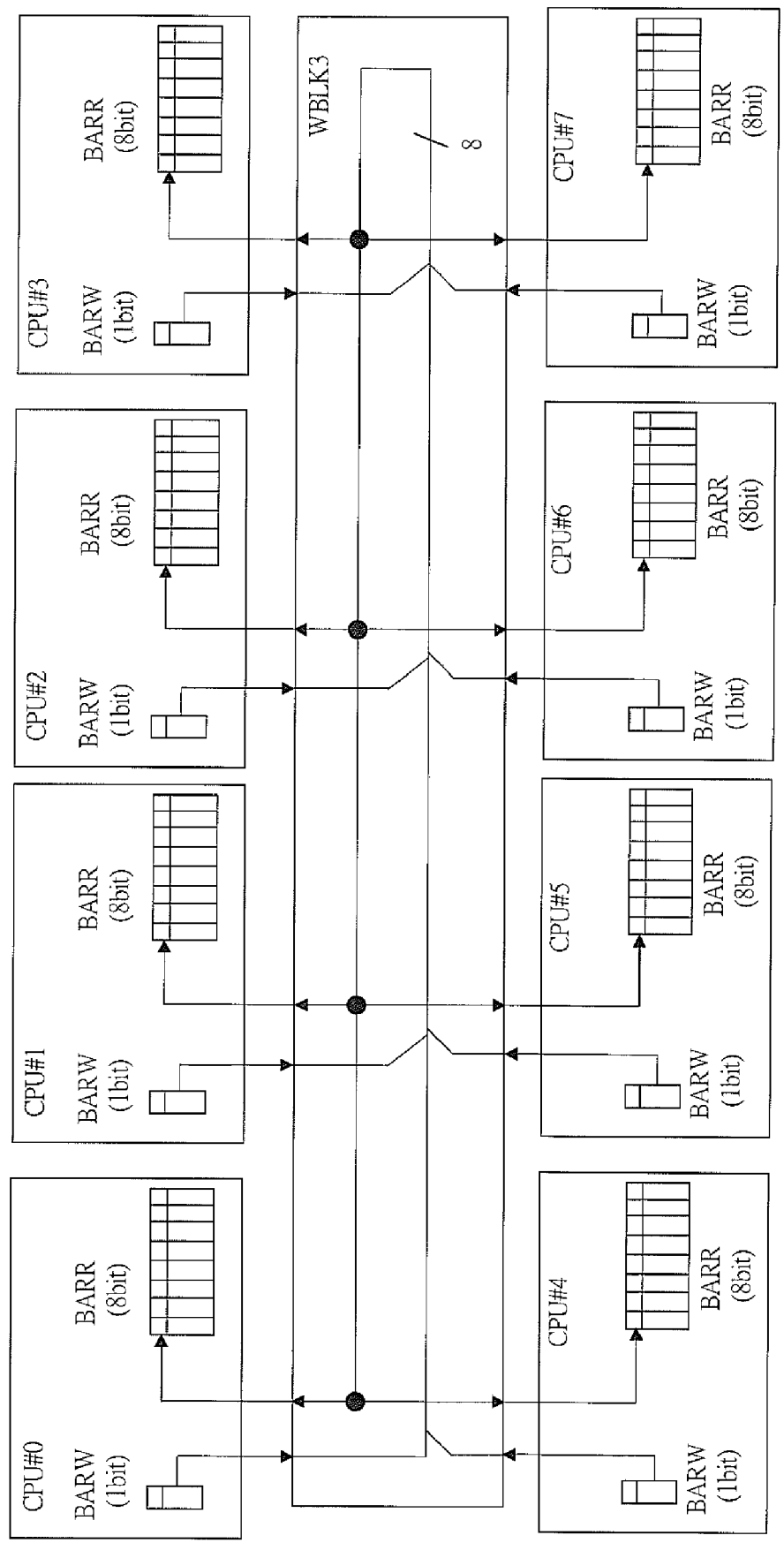
FIG. 3 is a schematic diagram showing another configuration example of the main part of the multiprocessor system according to the first embodiment of the present invention.

FIG. 3 is a schematic diagram showing another configuration example of the main part of the multiprocessor system according to the first embodiment of the present invention. Different from the case of FIG. 2, the multiprocessor system shown in FIG. 3 is the configuration example of the case where it is in a flat state without hierarchizing the eight CPUs CPU#0 to CPU#7 by the clusters CLS0 and CLS1. In the configuration example of FIG. 3, as well as the case of FIG. 2, the 1-bit barrier write registers BARW and the 8-bit barrier read registers BARR contained in the CPUs CPU#0 to CPU#7 are mutually connected. The relation of connections in this case is substantially same as the case of FIG. 2; however, the layout concept is different from that of FIG. 2.

More specifically, in the case of FIG. 2, the plurality of wiring blocks are provided so as to correspond to the plurality of clusters, respectively. In the wiring block corresponding to a certain cluster, BARW and BARR contained in the cluster of its own are mutually connected; the information of BARW in the cluster of its own is bundled as cluster information and transmitted to the other cluster; and cluster information from the other cluster is received and transmitted to BARR of the cluster of its own. On the other hand, in the case of FIG. 3, corresponding to the CPUs CPU#0 to CPU#7, one wiring block WBLK3 is provided. In WBLK3, the wiring (corresponding to 8 bits) from each BARW contained in each of the CPUs CPU#0 to CPU#7 is connected to the 8 bits of BARR contained in the CPUs CPU#0 to CPU#7, respectively.

In the configuration examples of FIG. 2 and FIG. 3, the barrier write registers BARW and the barrier read registers BARR can be realized by, for example, control registers, etc. to which access can be made when the CPU executes register access instructions, or can be realized by a memory mapped register, etc. to which access can be made when the CPU executes memory access instructions. The case where a memory mapped register is used is advantageous in terms of cost and from the viewpoint of readiness compared with the case where it is realized by a control register etc., since an instruction set, etc. of the CPU is not required to be added. The memory mapped register is not particularly limited, but is provided, for example, in the cache controller CCN of FIG. 1.

Figure 4:
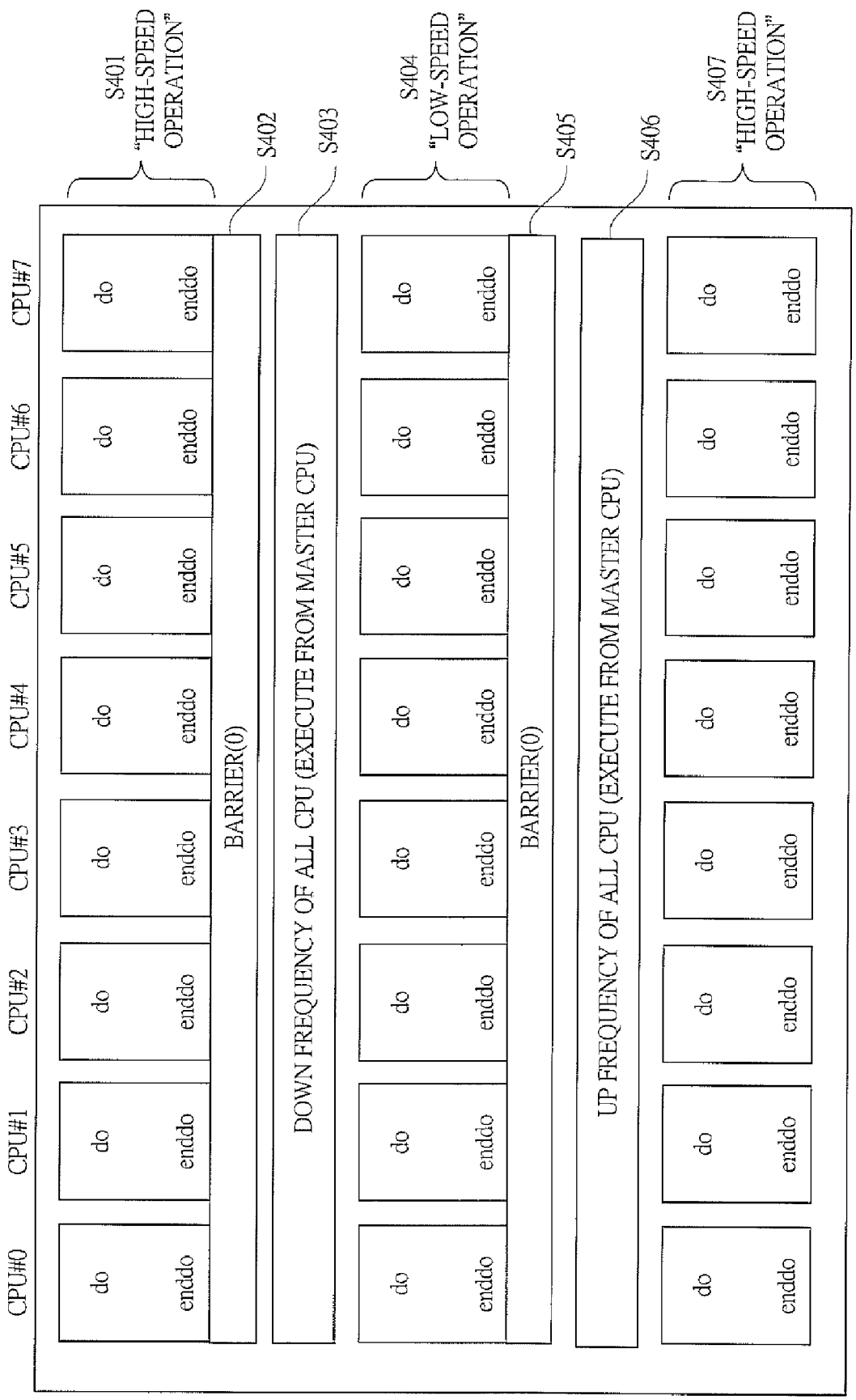
FIG. 4 is an explanatory diagram showing an example of an operation in the multiprocessor systems of FIG. 2 and FIG. 3.

FIG. 4 is an explanatory diagram showing an example of an operation in the multiprocessor systems of FIG. 2 and FIG. 3. In the multiprocessor systems, power can be saved by using, for example, the processing contents shown in FIG. 4. In FIG. 4, first of all, all the CPUs CPU#0 to CPU#7 parallelly execute predetermined processes (threads), which require high-speed operations, at high-speed clock frequencies (S401). In this process, each of the CPUs executes a barrier synchronization processing in which it rendezvouses with the other CPUs after its own process is completed (S402). When the barrier synchronization processing is completed, a master CPU (for example, the CPU CPU#0) or the like issues an instruction that lowers clock frequencies of all the CPUs (S403). In response to this, for example, the clock generating unit CPG, etc. of FIG. 1 lowers the clock frequencies.

Subsequently, all the CPUs CPU#0 to CPU#7 parallelly execute predetermined processes (threads), which do not require high-speed operations, at low-speed clock frequencies (S404). In this process, each of the CPUs executes barrier synchronization processing in which it rendezvouses with the other CPUs after its own process is completed (S405). When the barrier synchronization processing is completed, the master CPU (for example, the CPU CPU#0) or the like issues an instruction that increases the clock frequencies of all the CPUs (S406). Then, all the CPUs CPU#0 to CPU#7 parallelly execute predetermined processes, which require high-speed operations, at high-speed clock frequencies again (S407).

Figure 5:
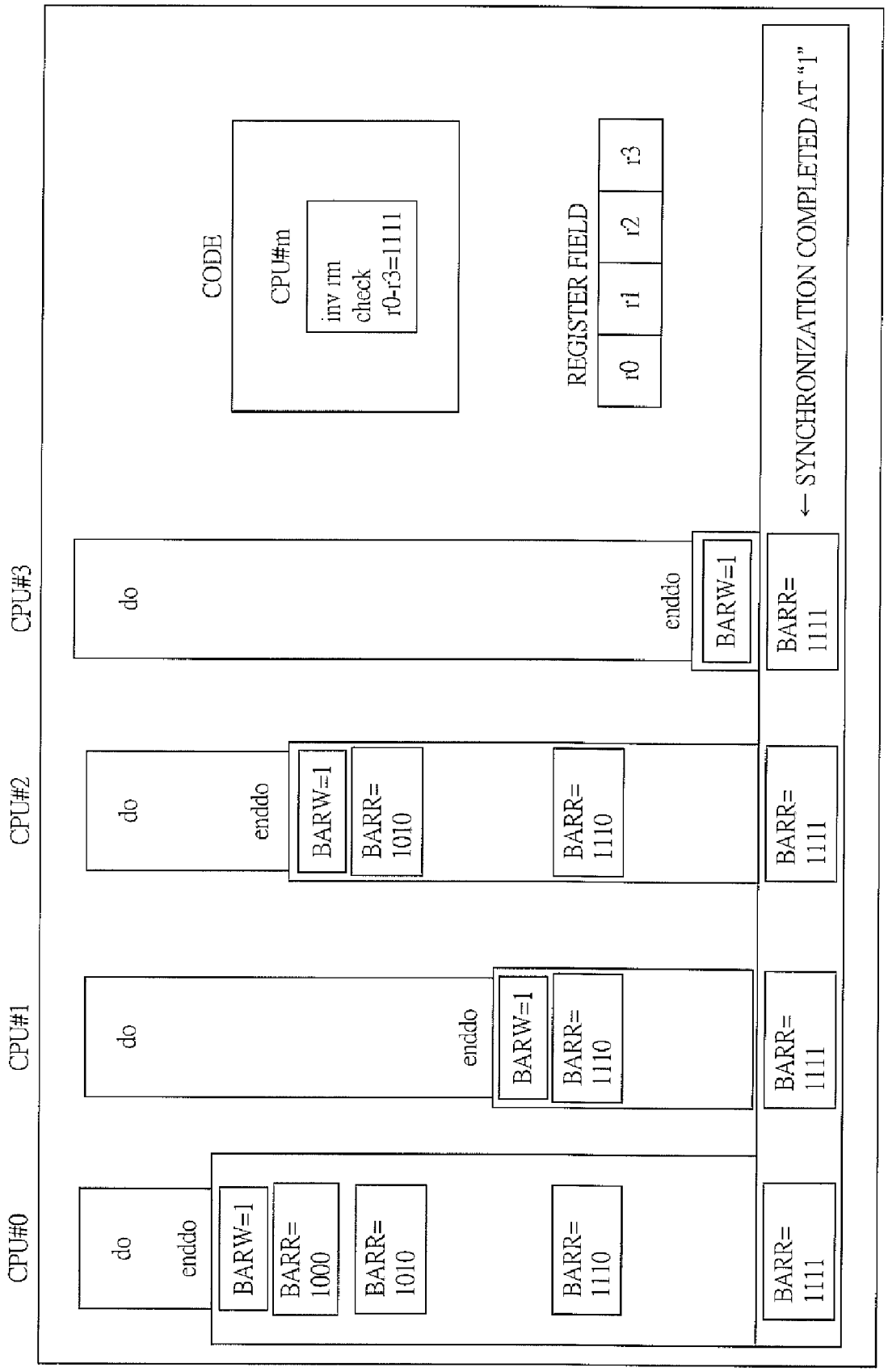
FIG. 5 is an explanatory diagram showing an example of detailed processing contents of the barrier synchronization processing in FIG. 4.

FIG. 5 is an explanatory diagram showing an example of detailed processing contents of the barrier synchronization processing in FIG. 4. In FIG. 5, for simplicity, descriptions will be given on the assumption that the number of all the CPUs is four (CPUs CPU#0 to CPU#3). First of all, in a code executed by each of the CPUs, a code for barrier synchronization processing is attached after a code which carries out a predetermined process (corresponding to "do to enddo"). The codes for barrier synchronization processing herein are "inv rm" and "check r0-r3=1111".

"inv rm" means an instruction that inverts the information of the barrier write register BARW. "rm" means a register field on software corresponding to BARW, and the suffix "m" means the CPU number. For example, "inv r0" is an instruction that inverts the information of BARW of the CPU CPU#0, and "inv r1" is an instruction that inverts the information of BARW of the CPU CPU#1. "check r0-r3=1111" means an instruction that causes it to stand-by until all the information of 4 bits of the barrier read register BARR become "1". In this instruction, the register field "r0-r3" represents BARR; however, since BARW and BARR are mutually connected, they can be handled by one register field in terms of software. More specifically, for example, "r0" is BARW of the CPU CPU#0 and, at the same time, is the bit [0]

of BARR contained in each of the CPUs CPU#0 to CPU#3; and "r3" is BARW of the CPU CPU#3 and, at the same time, is the bit [3] of BARR contained in each of the CPUs CPU#0 to CPU#3.

In the example of FIG. 5, first of all, the CPU CPU#0 which has completed the predetermined process first inverts its own BARW (initial value is assumed to be zero) to "1" in accordance with the following instruction "inv rm". This information is reflected to BARR of all the CPUs via the abovedescribed wiring block(s) WBLK (in the example of FIG. 5, reflected to bit [0]). Then, the CPU CPU#0 executes the instruction "check r0-r3=1111"; however, the CPU is caused to be in a stand-by state since the value of its own BARR is "1000". Then, the CPU CPU#2 which has completed the predetermined process inverts its own BARW (initial value is assumed to be zero) to "1" in accordance with the following instruction "inv rm". This information is reflected to BARR of all the CPUs via the abovedescribed wiring block(s) WBLK (in the example of FIG. 5, reflected to the bit [2]). Then, the CPU CPU#2 executes the instruction "check r0-r3=1111"; however, the CPU is caused to be in the stand-by state since the value of its own BARR is "1010". Similarly, the CPU CPU#0 also maintains the stand-by state since the value of its own BARR is "1010".

Subsequently, the CPU CPU#1 which has completed the predetermined process inverts BARW (initial value is assumed to be zero) of its own to "1" in accordance with the following instruction "inv rm". This information is reflected to BARR of all the CPUs via the abovedescribed wiring block(s) WBLK (in the example of FIG. 5, reflected to the bit [1]). Then, the CPU CPU#1 executes the instruction "check r0-r3=1111"; however, the CPU is caused to be in the stand-by state since the value of its own BARR is "1110". Similarly, the CPU CPU#0 and the CPU CPU#2 also maintain the stand-by state since the value BARR of their own is "1110".

Finally, the CPU CPU#3 which has completed the predetermined process inverts BARW (initial value is assumed to be zero) of its own to "1" in accordance with the following instruction "inv rm". This information is reflected to BARR of all the CPUs via the abovedescribed wiring block(s) WBLK (in the example of FIG. 5, reflected to the bit [3]). Then, the CPU CPU#3 executes the instruction "check r0-r3=1111" and proceeds to a subsequent process since the value of its own BARR is "1111". Similarly, the CPUs CPU#0, CPU#1, and CPU#2 proceeds to subsequent processes since the value of BARR of their own is "1111". In this manner, the barrier synchronization processing is completed.

Figure 6:
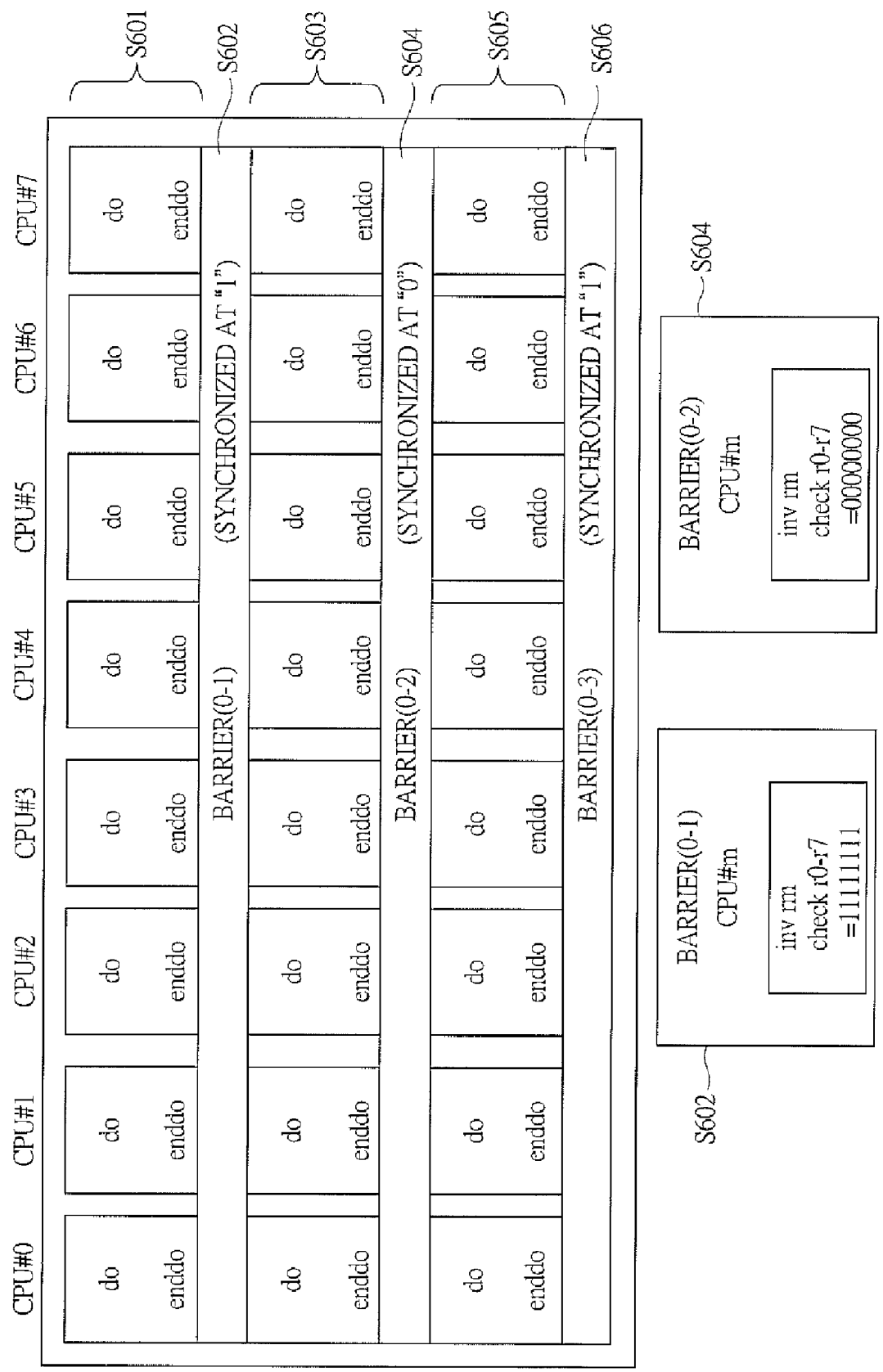
FIG. 6 is an explanatory diagram showing another example of an operation of the multiprocessor systems of FIG. 2 and FIG. 3.

FIG. 6 is an explanatory diagram showing another example of the operation of the multiprocessor systems of FIG. 2 and FIG. 3. In FIG. 6, each of the CPUs CPU#0 to CPU#7 carries out the processings: a predetermined processing (S601)→a barrier synchronization processing (S602)→a predetermined processing (S603)→a barrier synchronization processing (S604)→a predetermined processing (S605)→a barrier synchronization processing (S606). If the initial values of the barrier write register BARW and the barrier read register BARR in each of the CPUs CPU#0 to CPU#7 is "0", and when a barrier synchronization processing is carried out by using the instruction "inv rm" in the abovedescribed manner, the case where all the 8 bits of BARR are "1" is the synchronization point in the barrier synchronization processing (S602). Then, in the next barrier synchronization processing (S604), the case where all the 8 bits of BARR are "0" is the synchronization point; and, in the further next barrier synchronization processing (S606), the case where all the 8 bits of BARR are "1" is the synchronization point.

When the synchronization points are set while inverting "1" and "0" in this manner, the speed of the barrier synchronization processing can be increased, for example, compared with the case where the synchronization point is fixed to "1". In other words, the process of resetting the barrier write register BARW and the barrier read register BARR to "0" after completing certain barrier synchronization processing becomes unnecessary.

As described above, in the multiprocessor system of the first embodiment, the first register (BARW) which notifies the synchronization stand-by information of its own to the other CPUs and the second register (BARR) which retains the information of the first registers notified by the other CPUs are provided in each of the CPUs, and the information of the first registers are reflected to the second registers by direct wiring (for example, a metal wiring layer, etc.). Note that, the direct wiring does not necessarily comprise merely wiring, but includes practically equivalent cases, for example, like the case where a buffer circuit, a flip-flop circuit, etc. for adjusting drive power are interposed therein. When such a configuration is used, typical effects to be obtained are, for example, (1) a barrier synchronization processing highly-efficient in terms of time can be realized; and (2) that a barrier synchronization processing can be realized by low-cost hardware.

Regarding the effect (1), for example when the CPU CPU#0 writes information to the first register (BARW) in order to notify that it is waiting for synchronization as shown in FIG. 5, the information of the second registers (BARR) in the other CPUs CPU#1 to CPU#3 is automatically updated by the direct wiring instead of an indirect method such as interruption. Therefore, even when the CPUs CPU#1 to CPU#3 receive the synchronization stand-by notification from the CPU CPU#0, the processes they are currently executing are not disturbed, and the CPUs can maintain a high processing efficiency. Moreover, when the CPU CPU#3, which has completed the process in the last place, writes information to the first register (BARW), the information is promptly reflected to the second registers (BARR) of the respective CPUs by the direct wiring; therefore, the time required from the process completion of the CPU CPU#3 until completion of the barrier synchronization processing by all the CPUs can be shortened. Furthermore, in accordance with such a barrier synchronization processing, each of the CPUs is required to access the first and second registers provided in the interior of its own; therefore, access time can be also shortened compared with the case where access to other locations than itself is made. An improvement of efficiency in terms of time can be also achieved by setting the synchronization point while carrying out the inverting operation as shown in FIG. 6.

Regarding the effect (2), the multiprocessor system of the first embodiment has the configuration in which the first register (BARW) and the second register (BARR) are provided in the interior of each of the CPUs so that a barrier synchronization processing can be carried out by operating its own registers. Therefore, a special instruction for accessing to the other locations than itself becomes unnecessary, and cost can be lowered. Furthermore, since the barrier synchronization processing can be realized by realizing the first and second registers by the memory mapped register and executing memory access instructions that each CPU generally has, cost can be further lowered.

On the other hand, as a comparative example, when a technique like that of abovedescribed Patent Document 1 are used, the notification of synchronization stand-by is given via the system bus, and the synchronization registers showing the synchronization stand-by state of the other CPUs are configured to be checked every time the notification is given; therefore, the currently executing processes of the CPUs are disturbed along with the notification. Furthermore, arbitration of the bus access right of the system bus takes time. As a comparative example, when a technique like that of above-described Patent Document 2 or Non-Patent Document 1 is used, access to the flag register that is common to the CPUs is made; therefore, time may be taken more than the case where access to the register in the interior of the CPU is made, and, furthermore, the exclusive control thereof may take time. Note that, in the technique of Non-Patent Document 1, when it is configured so that write to the bits of the flag register can be independently and parallelly carried out, the exclusive control of the register access becomes unnecessary. However, when the configuration in which access to the common flag register provided outside the CPUs is made is used like these techniques, a special instruction (barrier synchronization instruction, etc.) gets to be required to be implemented in the instruction set of each CPU, thereby increasing cost.

Second Embodiment

Figure 7:
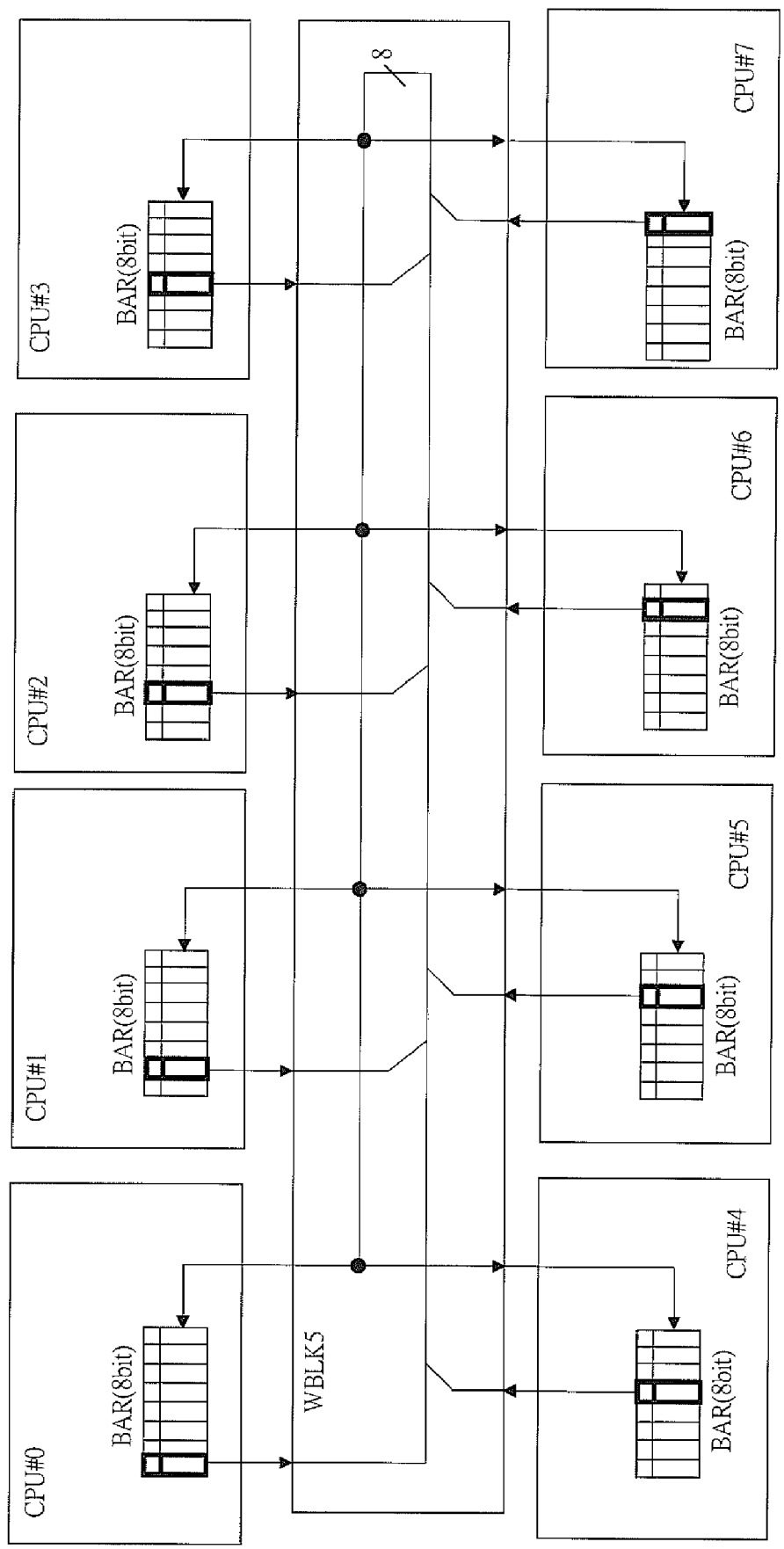
FIG. 7 is a schematic diagram showing a configuration example of a main part of a multiprocessor system according to a second embodiment of the present invention.

FIG. 7 is a schematic diagram showing a configuration example of a main part of a multiprocessor system according to a second embodiment of the present invention. In the abovedescribed first embodiment, the configuration example in which the barrier write register BARW and the barrier read register BARR are different registers (in the case of the address mapped register, a register in which addresses are individually allocated) has been shown. On the other hand, the multiprocessor system shown in FIG. 7 has a feature that the barrier write register BARW and the barrier read register BARR in abovedescribed FIG. 3 are integrated and serve as a common barrier register BAR. In FIG. 7, each of a plurality (herein, eight) of processors CPU#0 to CPU#7 has an 8-bit barrier register BAR. The equivalent bits in the barrier registers BAR are mutually connected by direct wiring by a wiring block WBLK5. More specifically, for example, eight bits [0] of BAR contained in the CPUs CPU#0 to CPU#7 are mutually connected, bits [1] are mutually connected, and, similarly, bits [2] to bits [7] are also mutually connected, respectively.

Each of the CPUs CPU#0 to CPU#7 is capable of making write access merely to the bit corresponding to itself in the barrier register BAR of its own and is capable of making read access to the 8 bits of BAR. More specifically, for example, the CPU CPU#0 is capable of making write access merely to the bit [0] of BAR of its own, and, similarly, the CPUs CPU#1, CPU#2, ... CPU#7 are capable of making write access merely to the bits [1], [2], ... [7] of BAR of their own, respectively. Therefore, when the CPUs CPU#0 to CPU#7 carry out write to the bits corresponding to themselves in BAR of their own, respectively, as well as the case of the first embodiment where write to the barrier write registers BARW is carried out, a barrier synchronization processing can be carried out as same as the case of the first embodiment.

When the multiprocessor system of the second embodiment is used as described above, in addition to the various effects described in the first embodiment, the area cost of the registers, etc. can be reduced, and the cost of hardware can be further reduced. However, it has to be configured so that write to merely particular one bit of own BAR can be carried out by, for example, a mask-write function, a read-modify-write function, or a function of carrying out management by allocating addresses to the bits, respectively; therefore, depending on the case, sometimes, a new control circuit may be required, or the processing time of 1-bit-write instruction may become longer.

Third Embodiment

Figure 8:
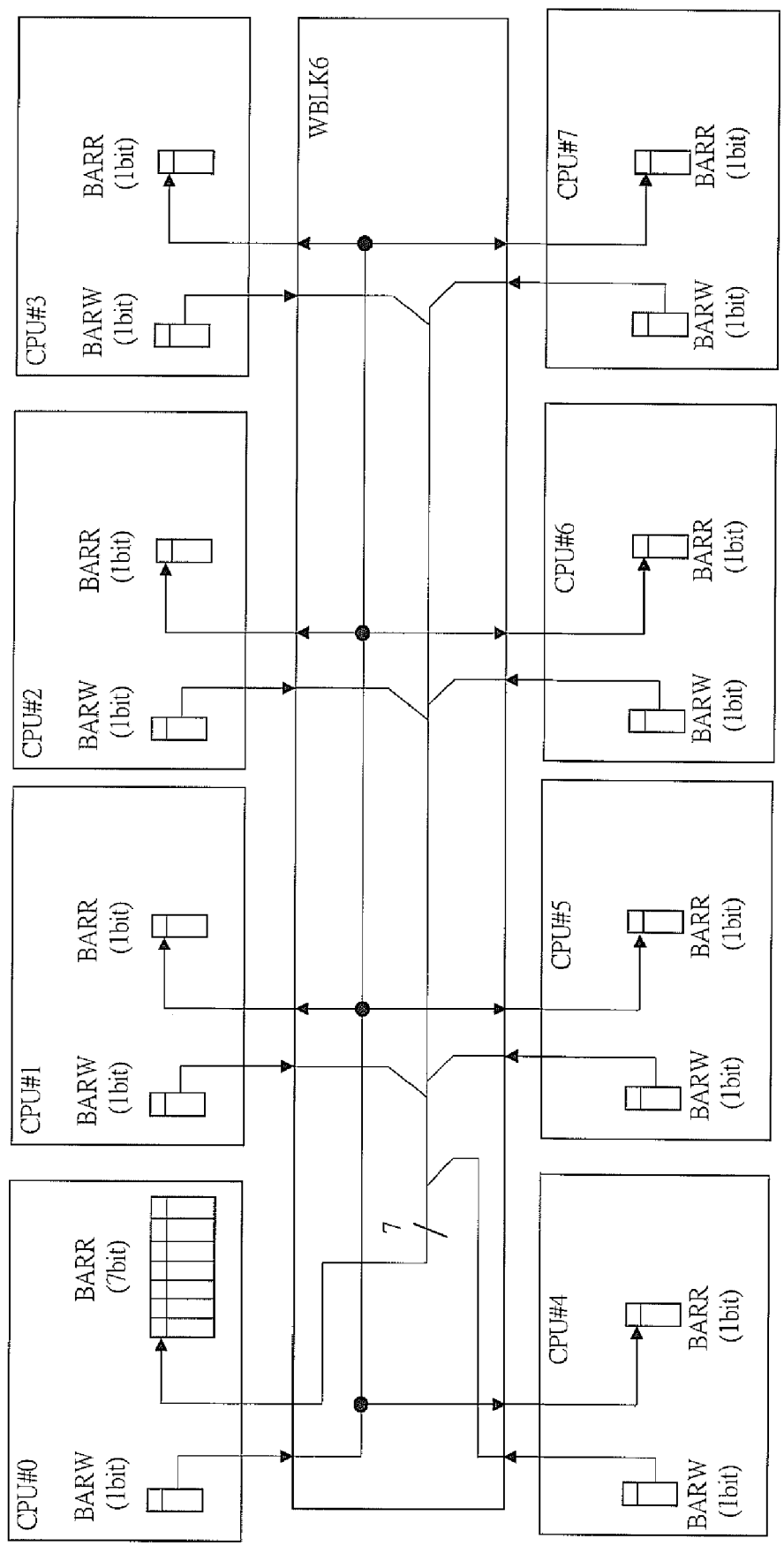
FIG. 8 is a schematic diagram showing a configuration example of a main part of a multiprocessor system according to a third embodiment of the present invention.

FIG. 8 is a schematic diagram showing a configuration example of a main part of a multiprocessor system of a third embodiment of the present invention. The multiprocessor system shown in FIG. 8 has a feature that one of the plurality of processors CPUs (herein, CPU CPU#0) serves as a master and that the master proactively monitor the synchronization stand-by state of the other CPUs, thereby reducing the number of bits of the barrier read register BARR compared with the abovedescribed case of FIG. 3.

In FIG. 8, the CPU CPU#0 serving as the master has the 1-bit barrier write register BARW and a 7-bit (herein, in order to facilitate understanding of the correspondence relation, the bit [0] is omitted, and the bits [1] to [7] are provided) barrier read register BARR. On the other hand, each of the other CPUs CPU#1 to CPU#7 has the 1-bit barrier write register BARW and a 1-bit barrier read register BARR. In a wiring block WBLK6, the bits of the 7-bit BARR in the CPU CPU#0 and BARW contained in the CPUs CPU#1 to CPU#7 are connected, respectively, by direct wiring. More specifically, for example, BARW of the CPU CPU#1 is connected to the bit [1] of BARR of the CPU CPU#0; and, similarly, BARW of the CPUs CPU#2, CPU#3, ... CPU#7 are connected to the bit [2], bit [3], ... bit [7], respectively. In addition, in WBLK6, BARW of the CPU CPU#0 is connected to the 1-bit BARR contained in each of the CPUs CPU#1 to CPU#7 by direct wiring by broadcasting.

Figure 9:
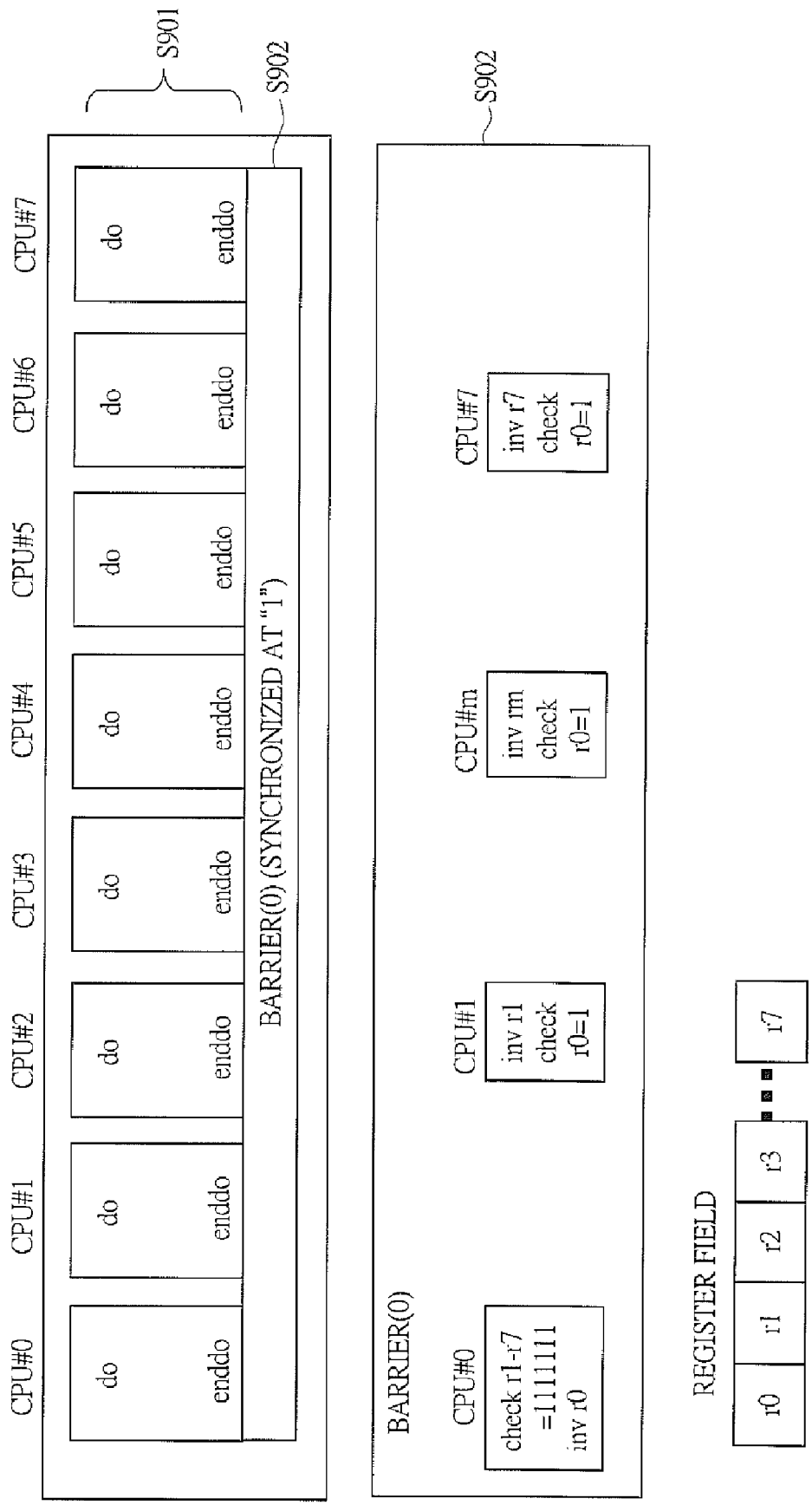
FIG. 9 is an explanatory diagram showing an operation example of barrier synchronization processing of the case where the configuration example of FIG. 8 is used.

FIG. 9 is an explanatory diagram showing an operation example of barrier synchronization processing of the case where the configuration example of FIG. 8 is used. In FIG. 9, after executing a predetermined process (thread) (S901), the CPUs CPU#0 to CPU#7 carry out the barrier synchronization processing (S902). In the barrier synchronization processing, different from the abovedescribed cases of FIG. 5 and FIG. 6, codes in the CPU CPU#0 serving as the master and the other CPUs CPU#1 to CPU#7 are different. More specifically, in a brief explanation, the CPU CPU#0 serving as the master checks synchronization stand-by of the other CPUs CPU#1 to CPU#7 and then sets synchronization stand-by in BARW of its own, and the barrier synchronization processing is carried out when the setting of synchronization stand-by in CPU#0 is concurrently detected by the other CPUs CPU#1 to CPU#7 by BARR of their own.

Figure 10:
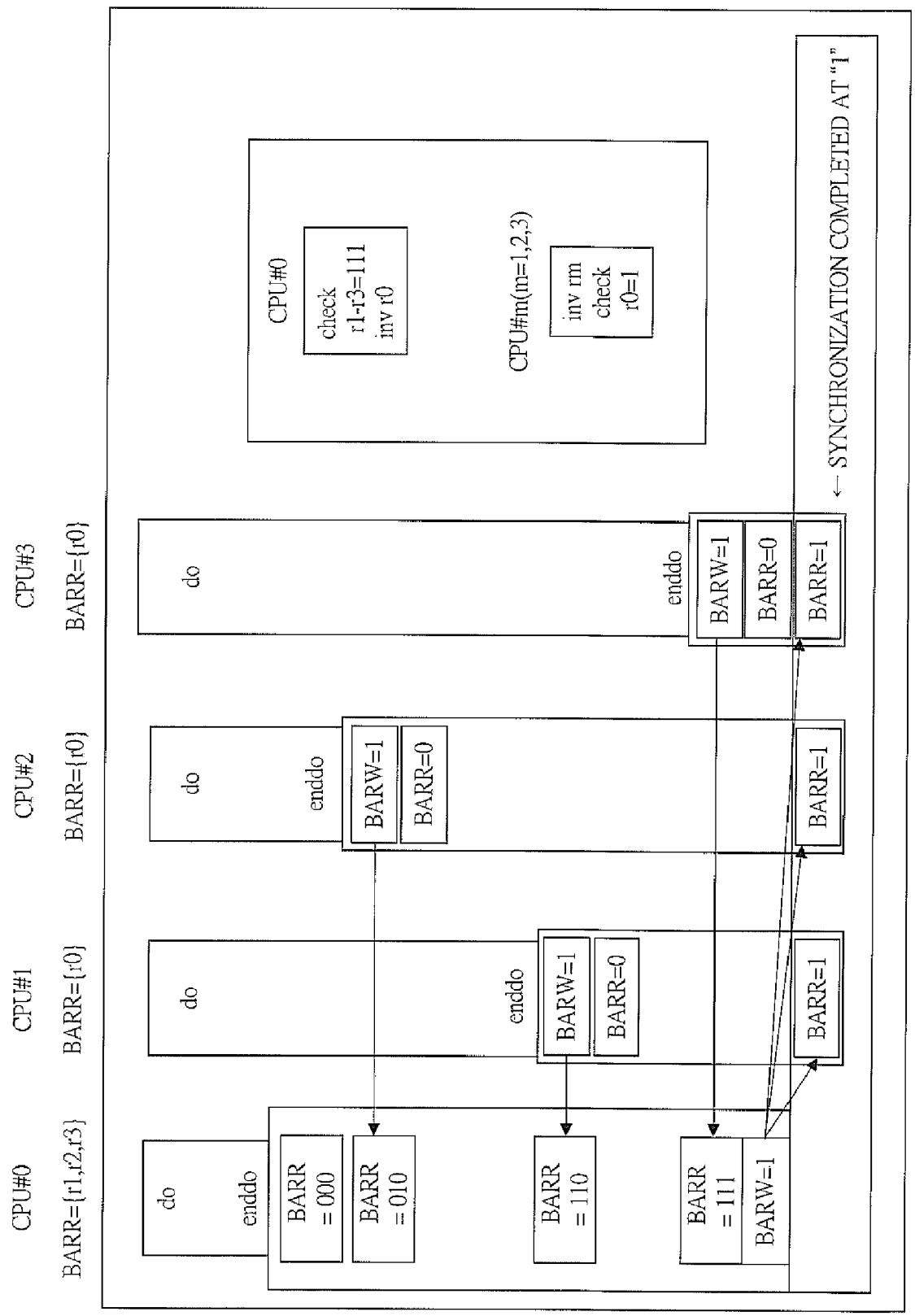
FIG. 10 is an explanatory diagram showing an example of more detailed processing contents of the barrier synchronization processing in FIG. 9.

FIG. 10 is an explanatory diagram showing an example of more detailed processing contents of the barrier synchronization processing in FIG. 9. Herein, for simplicity, descriptions will be given on the assumption that there are four CPUs CPU#0 to CPU#3. As shown in FIG. 10, the CPU CPU#0 serving as the master execute an instruction "check r1-r3=111" and then an instruction "inv r0" after completing a predetermined process (corresponding to "do to enddo"). On the other hand, each of the other CPUs CPU#1 to CPU#3 executes an instruction "inv rm " (m is the CPU number) and then an instruction "check r0=1" after completing a predetermined process (corresponding to "do to enddo").

In the example of FIG. 10, first of all, the CPU CPU#0, which has completed the predetermined process first, executes the following instruction "check r1-r3=111"; however, synchronization stand-by flags have not yet been set in BARWs of the other CPUs CPU#1 to CPU#3, and the value of BARR of the CPU CPU#0 is correspondingly "000" (initial value is assumed to be zero); therefore, the CPU CPU#0 is caused to be in a stand-by state. Then, the CPU CPU#2, which has completed the predetermined process, inverts BARW (initial value is assumed to be zero) of its own to "1" in accordance with the following instruction "inv rm". This information is reflected to BARR of the CPU CPU#0 (reflected to the bit [2] in the example of FIG. 10) via the abovedescribed wiring block WBLK6. Then, CPU#2 executes the instruction "check r0=1"; however, the CPU#0 has not yet set the synchronization stand-by flag in BARW, and the value of BARR of CPU#2 is correspondingly "0"; therefore, CPU#2 is caused to be in the stand-by state. On the other hand, the CPU CPU#0 also maintains the stand-by state since the value of BARR of its own is "010".

Subsequently, the CPU CPU#1, which has completed the predetermined process, inverts BARW (initial value is assumed to be zero) of its own to "1" in accordance with the instruction "inv rm" thereafter. This information is reflected to BARR of the CPU CPU#0 (reflected to the bit [1] in the example of FIG. 10) via the abovedescribed wiring block WBLK6. Then, the CPU CPU#1 executes the instruction "check r0=1"; however, the CPU CPU#0 has not yet set the synchronization stand-by flag in BARW, and the value of BARR of CPU#1 is correspondingly "0"; therefore, CPU#1 is caused to be in the stand-by state. On the other hand, the CPU CPU#0 also maintains the stand-by state since the value of BARR of its own is "110".

Finally, the CPU CPU#3, which has completed the predetermined process, inverts BARW (initial value is assumed to be zero) of its own to "1" in accordance with the following instruction "inv rm". This information is reflected to BARR of the CPU CPU#0 (reflected to the bit [3] in the example of FIG. 10) via the abovedescribed wiring block WBLK6. Then, CPU#3 executes the instruction "check r0=1"; however, the CPU CPU#0 has not yet set the synchronization stand-by flag in BARW, and the value of BARR of CPU#3 is correspondingly "0"; therefore, CPU#3 is caused to be in the stand-by state. On the other hand, since the value of BARR of CPU#0 has become "111", the CPU CPU#0 inverts BARW (initial value is assumed to be zero) of its own to "1" in accordance with the following instruction "inv r0" and proceeds to a subsequent process. In addition, in parallel to this, the information of BARW of CPU#0 is promptly reflected to BARRs of the CPUs CPU#1 to CPU#3 via the abovedescribed wiring block WBLK6. Consequently, the CPUs CPU#1 to CPU#3, which have been in the stand-by state, proceed to subsequent processes since BARRs of their own have become "1". The barrier synchronization processing is completed in this manner.

When the multiprocessor system of the third embodiment as described above is used, in addition to the various effects described in the first embodiment, the area cost of the registers can be significantly reduced, and hardware cost can be further lowered. Note that, compared with the case of the first embodiment, the time taken until synchronization of all the CPUs is completed after the process of the last CPU is finished may be slightly lengthened; however, a still satisfactory high-speed performance can be ensured.

Fourth Embodiment

Figure 11:
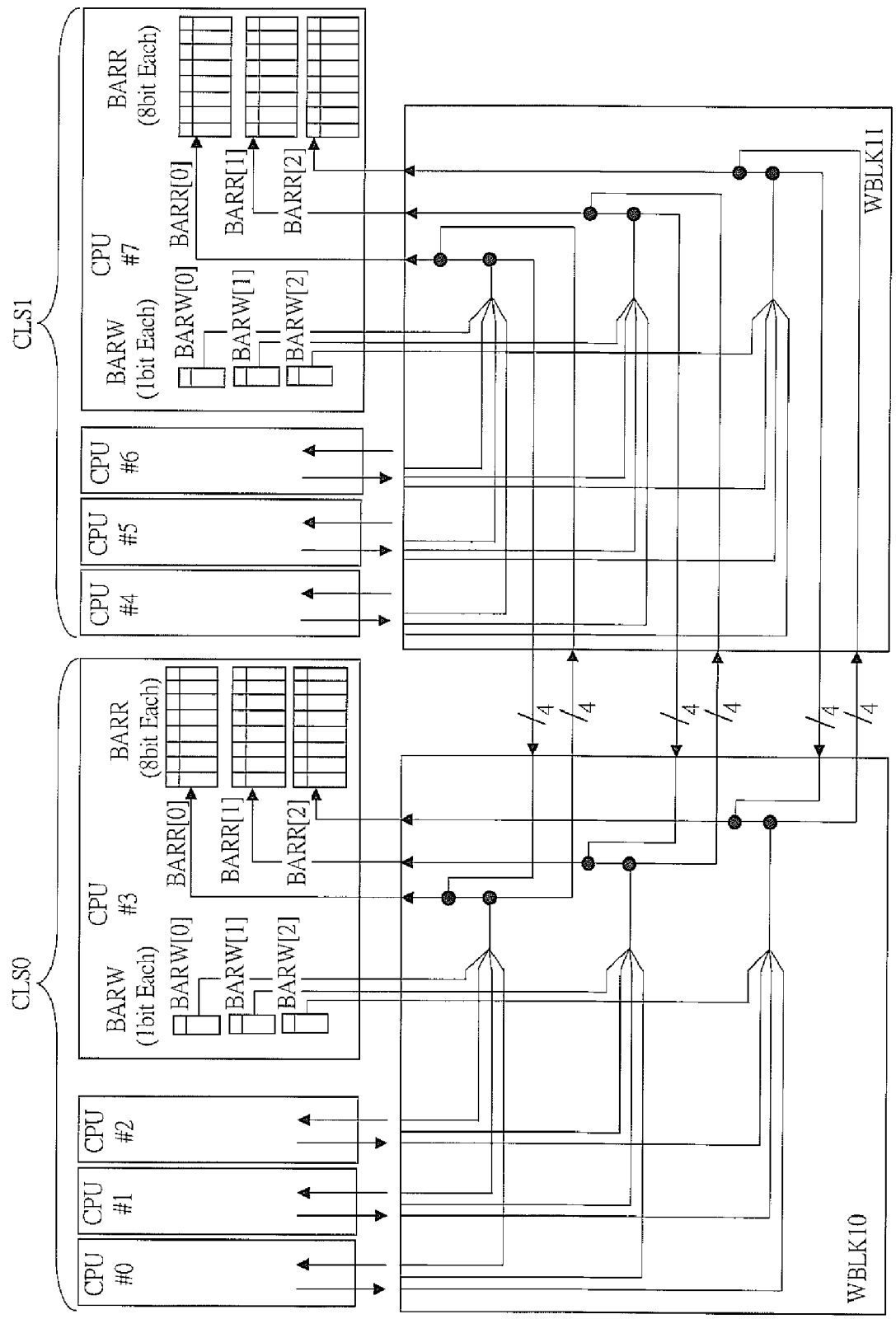
FIG. 11 is a schematic diagram showing a configuration example of a main part of a multiprocessor system according to a fourth embodiment of the present invention.

FIG. 11 is a schematic diagram showing a configuration example of a main part of a multiprocessor system according to a fourth embodiment of the present invention. The multiprocessor system shown in FIG. 11 has a feature of having a plurality of sets (herein, three sets) of the barrier write registers BARWs and the barrier read registers BARRs in each of the processors CPUs CPU#0 to CPU#7, compared with the configuration example of FIG. 2.

As same as the case of FIG. 2, the multiprocessor system of FIG. 11 contains the cluster CLS0 comprising the CPUs CPU#0 to CPU#3 and the cluster CLS1 comprising the CPUs CPU#4 to CPU#7. Different from the case of FIG. 2, each of the CPUs CPU#0 to CPU#7 contains three sets of 1-bit barrier write registers BARWs [0] to [2] and three sets of 8-bit barrier read registers BARRs [0] to [2]. Note that, in FIG. 11, CPU#0, CPU#1, and CPU#2 have a same configuration with CPU#3; and CPU#4, CPU#5, and CPU#6 have a same configuration with CPU#7.

A wiring block WBLK10 for the cluster CLS0 connects a 4-bit wiring for the set [0] from each BARW [0] contained in each of the CPUs CPU#0 to CPU#3 to particular 4 bits (for example, bits [0] to [3]) in each BARR [0] contained in each of the CPUs CPU#0 to CPU#3 by broadcasting and also extends the wiring toward a wiring block WBLK11. Similarly, a 4-bit wiring for the set [1] from each BARW [1] contained in each of the CPUs CPU#0 to CPU#3 and a 4-bit wiring for the set [2] from each BARW [2] are connected to, for example, the bits [0] to [3] in each BARR [1] contained in each of the CPUs CPU#0 to CPU#3 and, for example, the bits [0] to [3] in each BARR [2], respectively. In addition, WBLK10 extends the 4-bit wiring for the set [1] and for the set [2] toward the wiring block WBLK11.

The wiring block WBLK11 for the cluster CLS1 connects the 4-bit wiring for the set [0] from each BARW [0] contained in each of the CPUs CPU#4 to CPU#7 to particular 4 bits (for example, the bits [4] to [7]) in each BARR [0] contained in each of the CPUs CPU#4 to CPU#7, respectively, by broadcasting, and extends the wiring toward the wiring block WBKL10. Similarly, the 4-bit wiring for the set [1] from each BARW [1] contained in each of the CPU CPU#4 to CPU#7 and the 4-bit wiring for the set [2] from each BARW [2] are connected to, for example, the bits [4] to [7] in each BARR [1] contained in each of the CPUs CPU#4 to CPU#7 and, for example, to the bits [4] to [7] in each BARR [2], respectively. WBLK11 extends the 4-bit wirings for the set [1] and for the set [2] toward the wiring block WBLK10.

WBLK10 connects the 4-bit wiring for the set [0] extended from WBLK11 to particular 4 bits (for example, the bits [4] to [7]) in each BARR [0] contained in each of the CPUs CPU#0 to CPU#3 by broadcasting. Similarly, the 4-bit wiring for the set [1] and the 4-bit wiring for the set [2] extended from WBLK11 are connected to, for example, the bits [4] to [7] in each BARR [1] contained in each of the CPUs CPU#0 to CPU#3 and to, for example, the bits [4] to [7] in each BARR [2] contained in each of the CPUs CPU#0 to CPU#3. WBLK11 connects the 4-bit wiring for the set [0] extended from WBLK10 to particular 4 bits (for example, the bits [0] to [3]) in each BARR [0] contained in each of the CPUs CPU#4 to CPU#7 by broadcasting. Similarly, the 4-bit wiring for the set [1] and the 4-bit wiring for the set [2] extended from WBLK10 are connected to, for example, the bits [0] to [3] in each BARR [1] contained in each of the CPUs CPU#4 to CPU#7 and, for example, to the bits [0] to [3] in each BARR [2] contained in each of the CPUs CPU#4 to CPU#7, respectively.

Figure 12:
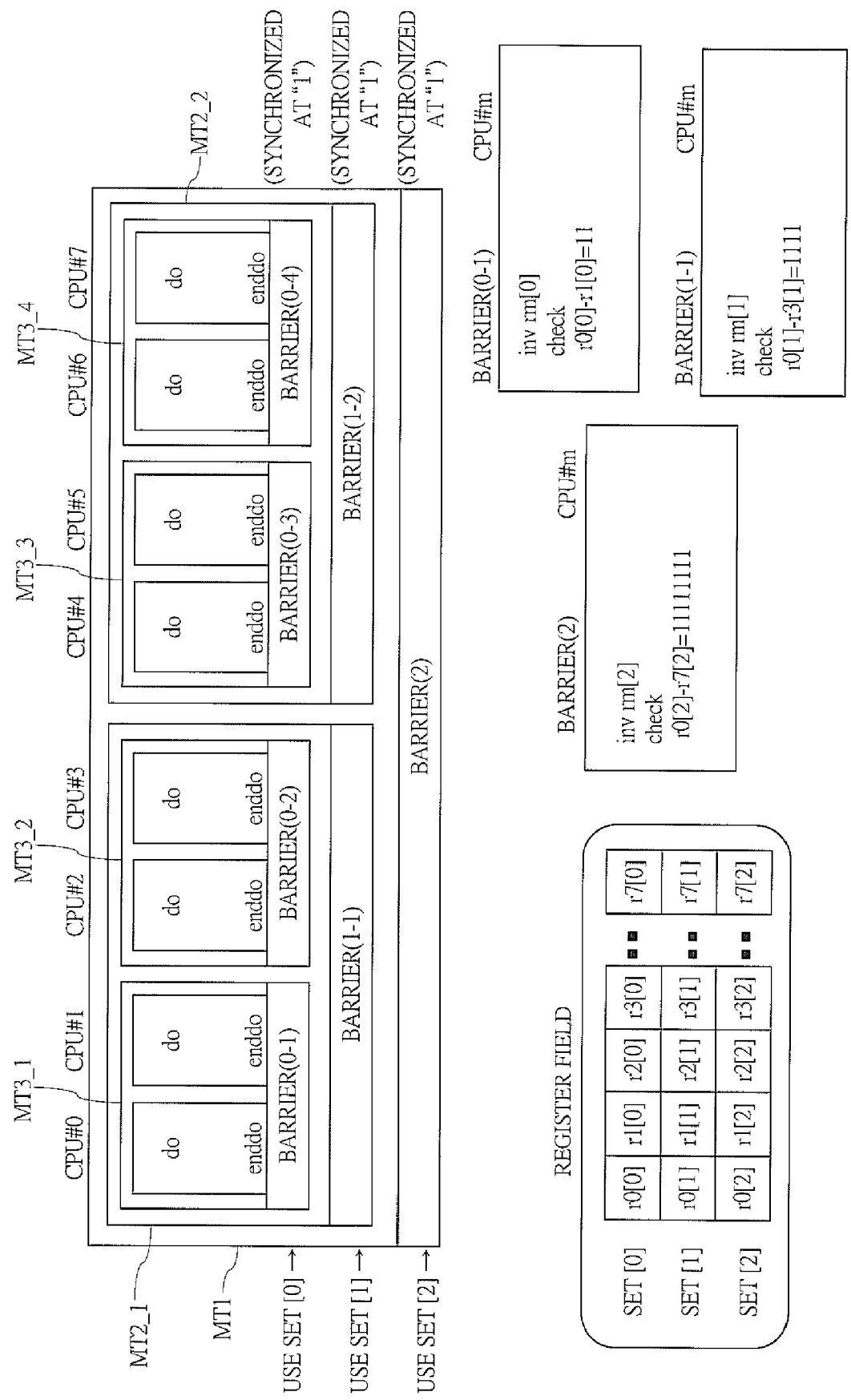
FIG. 12 is an explanatory diagram showing an example of an operation of the multiprocessor system of FIG. 11.

FIG. 12 is an explanatory diagram showing an example of the operation of the multiprocessor system of FIG. 11. The example of FIG. 12 shows an operation example of the case where, for example, a certain loop process is shared and executed by eight CPUs. As shown in FIG. 12, a compiler allocates processes to the CPUs so that, for example, a first-layer loop process MT1 executed by eight CPUs includes second-layer loop processes MT2_1 and MT2_2 to be executed by four CPUs, and that the second-layer loop processes further include third-layer loop processes MT3_1 to MT3_4 to be executed by two CPUs. Consequently, the barrier synchronization processing is necessary to be carried out by using different resources for the loop layers, respectively. Therefore, when the barrier write registers BARW and the barrier read registers BARR are provided by the number of the sets corresponding to the number of layers as shown in FIG. 11, such loop processes can be readily realized.

In FIG. 12, after the CPUs CPU#0 and CPU#1 carry out the predetermined loop processes (do to enddo), the CPUs CPU#0 and CPU#1 carry out a barrier synchronization processing (BARRIER(0-1) by using the barrier write registers BARW [0] and the barrier read registers BARR [0] for the set [0] of their own. Similarly, after the CPUs CPU#2 and CPU#3 carry out the predetermined loop processes (do to enddo), the CPUs CPU#2 and CPU#3 carry out a barrier synchronization processing (BARRIER(0-2)) by using BARW [0] and BARR [0] of their own; and, the CPUs CPU#4 and CPU#5 and the CPUs CPU#6 and CPU#7 also similarly carry out a barrier synchronization processing (BARRIER(0-3)) and a barrier synchronization processing (BARRIER(0-4)), respectively.

After the barrier synchronization processing between two CPUs is completed in this manner, a barrier synchronization processing is carried out among four CPUs. More specifically, the CPUs CPU#0 to CPU#3 carry out a barrier synchronization processing (BARRIER(1-1)) by using the barrier write registers BARW [1] and the barrier read registers BARR [1] for the set [1] of their own. Similarly, the CPUs CPU#4 to CPU#7 carry out a barrier synchronization processing (BARRIER(1-2)) by using BARW [1] and BARR [1] of their own. After the barrier synchronization processing among the four CPUs is completed, a barrier synchronization processing among the eight CPUs is carried out. More specifically, the CPUs CPU#0 to CPU#7 carry out a barrier synchronization processing (BARRIER(2)) by using the barrier write registers BARW [2] and the barrier read registers BARR [2] for the set [2] of their own.

Herein, in the barrier synchronization processing (BARRIER(O-1)), first of all, the CPUs CPU#0 and CPU#L invert BARW [0] (initial value is '0') of their own, for example, in accordance with an instruction "inv rm [0]". Then, the CPUs wait until both the 0-th bit (i.e., BARW [0] of CPU#0) and a first bit (i.e., BARW [0] of CPU#1) of BARR [0] of their own become '1' in accordance with "check r0[0]-r1[0]=11". Note that, although it is not illustrated, in the barrier synchronization processing (BARRIER(0-2)), similarly, the CPUs CPU#2 and CPU#3 wait until both a second bit (i.e., BARW [0] of CPU#2) and a third bit (i.e., BARW [0] of CPU#3) become '1' in accordance with "check r2[0]-r3[0]=11".

In the barrier synchronization processing (BARRIER(1-1)), first of all, the CPUs CPU#0 to CPU#3 invert BARW [1] (initial value is '0') of their own, for example, in accordance with an instruction "inv rm [1]". Then, the CPUs wait until all of the 0-th bit (BARW [1] of CPU#0), first bit (BARW [1] of CPU#1), second bit (BARW [1] of CPU#2), and third bit (BARW [1] of CPU#3) become '1' in accordance with "check r0[1]-r3[1]=1111". Furthermore, in the barrier synchronization processing (BARRIER(2)), first of all, the CPUs CPU#0 to CPU#7 invert BARW [2] of their own (initial value is '0'), for example, in accordance with an instruction "inv rm [2]". Then, the CPUs wait until all of the 0th to 7th bits (corresponding to BARW [2] of the CPUs CPU#0 to CPU#7) of BARR [2] of their own become '1' in accordance with "check r0[2]-r7[2]=11111111".

When the plurality of sets of the barrier write registers BARW and the barrier read registers BARR are provided in this manner, the processing contents (threads) containing barrier synchronization processing of a plurality of layers such that synchronizations of all the CPUs are finally carried out while successively carrying out synchronizations (i.e., groupings) of CPUs with a small number of the CPUs can be executed. Note that, as the number of the sets, when layers are allocated with dividing the entirety by two by the compiler as shown in FIG. 12, when the number of the CPUs is taken as "i", "$\log_2 i$" sets or more are desirably provided. More specifically, in the case of i=8, three sets or more are desirably provided. However, between two CPUs, since synchronization using software can be readily realized, "($\log_2 i$)−1" or more sets may be provided depending on the case. In other words, depending on the case, two or more sets may be provided with respect to i=8.

Figure 13:
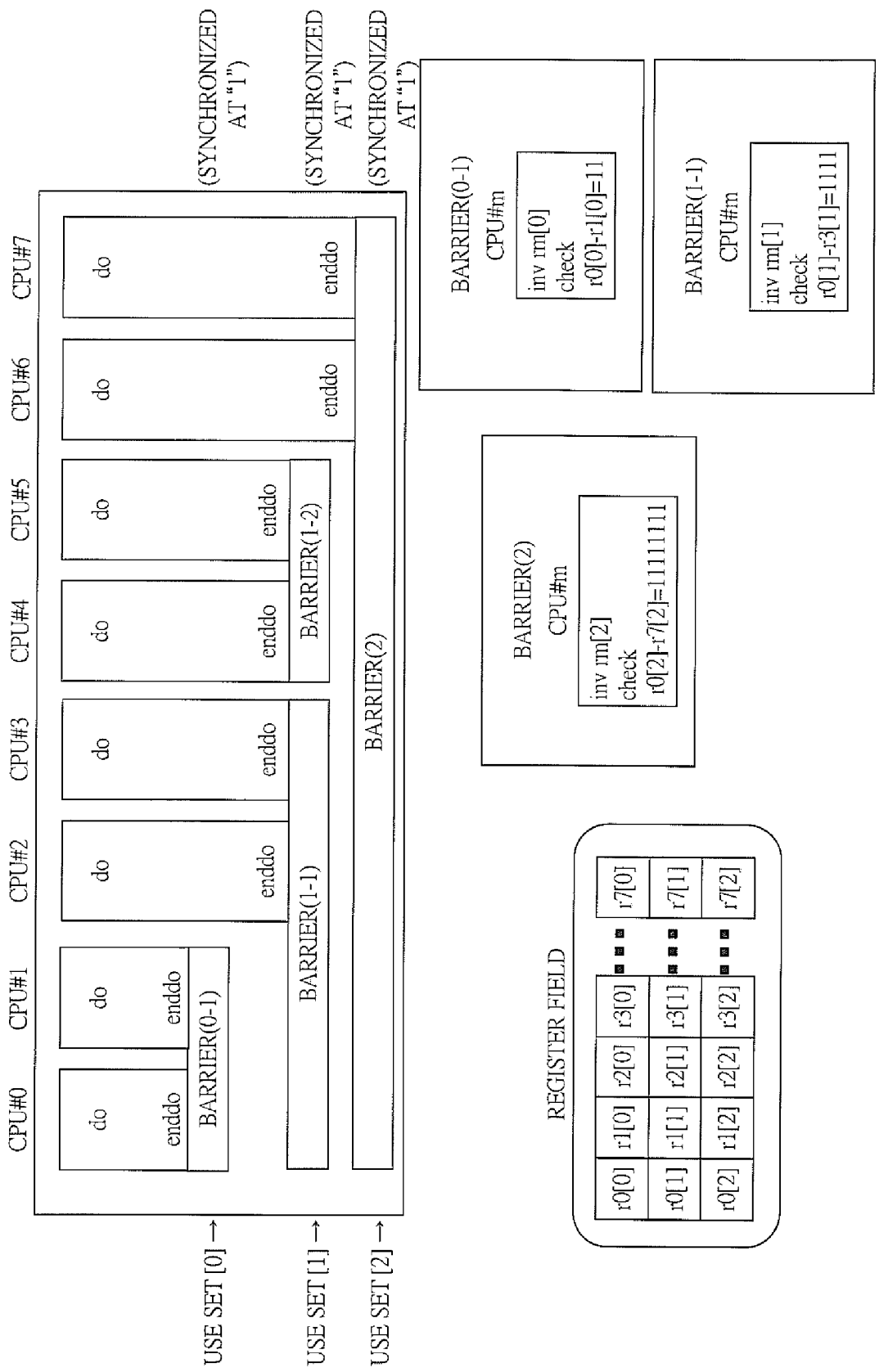
FIG. 13 is an explanatory diagram showing another example of an operation of the multiprocessor system of FIG. 11.
Figure 14:
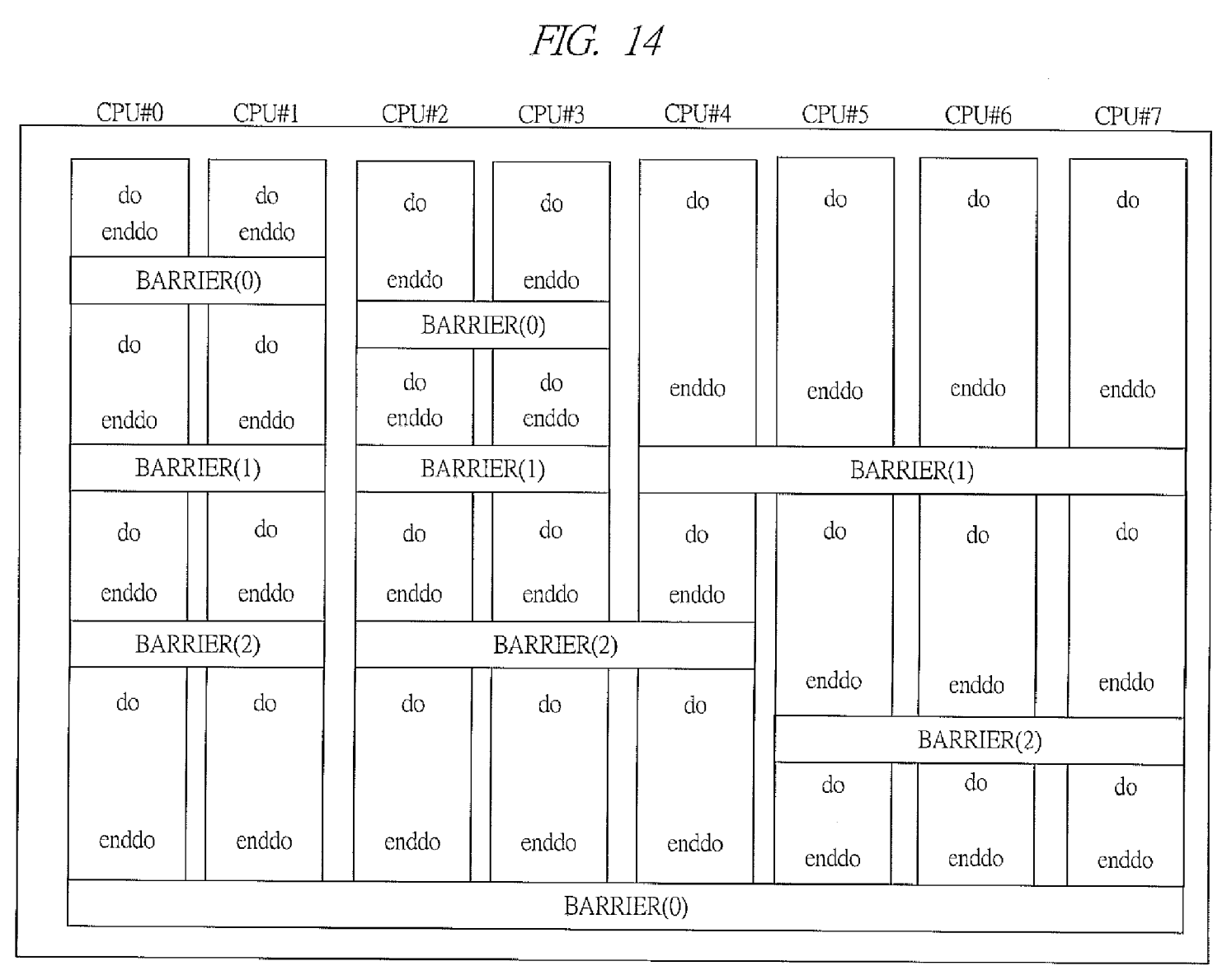

FIG. 13 is an explanatory diagram showing another example of the operation of the multiprocessor system of FIG. 11, and FIG. 14 is an explanatory diagram showing still another example of the operation of the multiprocessor system of FIG. 11. In the example of FIG. 13, the CPU#0 and the CPU#1 carry out the barrier synchronization processing (BARRIER(0-1)) by using BARW [0] and BARR [0] for the set [0]. Then, the CPU#2 and the CPU#3 are added thereto, and the CPUs CPU#0 to CPU#3 carry out the barrier synchronization processing (BARRIER(1-1)) by using BARW [1] and BARR [1] for the set [1].

On the other hand, in parallel with the processing of the CPUs CPU#0 to CPU#3, the CPUs CPU#4 and CPU#5 carry out the barrier synchronization processing (BARRIER(1-2)) by using BARW [1] and BARR [1] of the set [1]. Then, finally, the CPUs CPU#6 and CPU#7 are added thereto, and the CPUs CPU#0 to CPU#7 carry out the barrier synchronization processing (BARRIER(2)) by using BARW [2] and BARR [2] for the set [2].

In the example of FIG. 14, the CPUs CPU#0 and CPU#1 carry out the barrier synchronization processing (BARRIER(0)) by using BARW [0] and BARR [0] for the set [0] and then carry out the barrier synchronization processing (BARRIER(1)) by using BARW [1] and BARR [1] for the set [1]. On the other hand, in parallel with this, the CPUs CPU#2 and CPU#3 carry out the barrier synchronization processing (BARRIER(0)) by using BARW [0] and BARR [0] for the set [0] and then carry out the barrier synchronization processing (BARRIER(1)) by using BARW [1] and BARR [1] for the set [1]. Furthermore, in parallel to this, the CPUs CPU#4 to CPU#7 carry out the barrier synchronization processing (BARRIER(1)) by using BARW [1] and BARR [1] for the set [1].

Then, the CPUs CPU#0 and CPU#1 carry out the barrier synchronization processing (BARRIER(2)) by using BARW [2] and BARR [2] for the set [2]; and, similarly, the CPUs CPU#2 to CPU#4 and the CPUs CPU#5 to CPU#7 also carry out the barrier synchronization processing (BARRIER(2)) by using BARW [2] and BARR [2] for the set [2]. Then, finally, the CPUs CPU#0 to CPU#7 carry out the barrier synchronization processing (BARRIER(0)) by using BARW [0] and BARR [0] for the set [0].

As described above, also in the case where a final barrier synchronization processing is carried out while the CPUs carrying out complex groupings, it is also readily manageable when each of the CPUs has the plural sets of the barrier write registers BARW and the barrier read registers BARR. Note that, in the example of FIG. 11, each of the barrier read registers BARR of the CPUs has an 8-bit configuration corresponding to the number of the CPUs; however, as a matter of course, the number of the bits of BARR can be reduced by defining a master CPU like the manner described in the third embodiment (FIG. 8 to FIG. 10). Also, like the manner described in the second embodiment (FIG. 7), the barrier write registers BARW and the barrier read registers BARR can be integrated. In the following, a configuration example and an operation example of the case where a master CPU is defined like the third embodiment will be described below.

Figure 15:
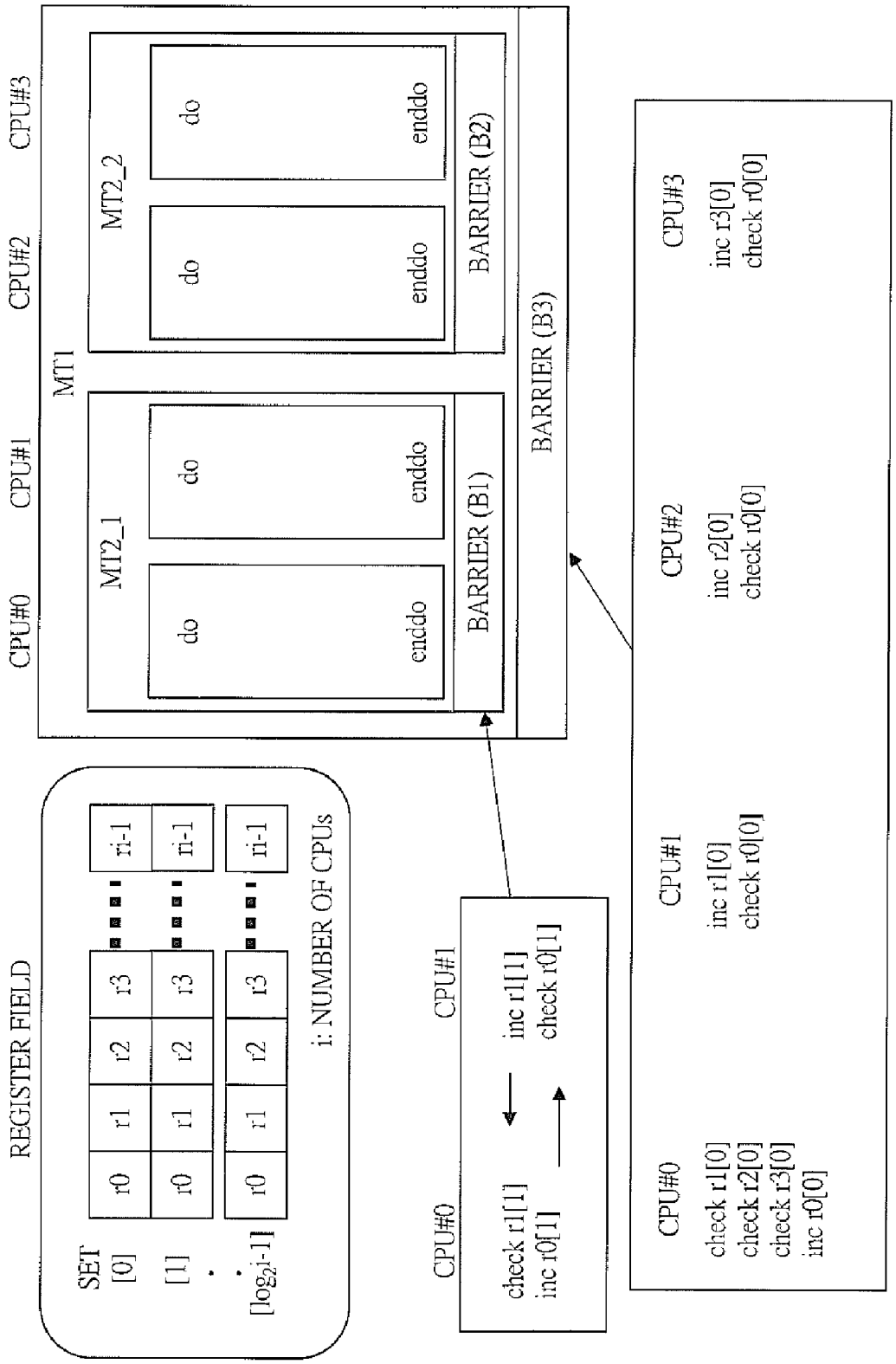
FIG. 15 is an explanatory diagram showing an operation example, which is a modification of FIG. 12, in the multiprocessor system according to the fourth embodiment of the present invention.

FIG. 15 is an explanatory diagram showing an operation example, which is a modification of FIG. 12, in the multiprocessor system according to the fourth embodiment of the present invention. Herein, for example, the case where the number of CPUs is four, and a loop process MT1 to be executed by the four CPUs includes loop processes MT2_1 and MT2_2 to be executed by two CPUs is described as an example. In FIG. 15, the CPUs CPU#0 and CPU#1 carry out predetermined processes and then carry out a barrier synchronization processing (BARRIER(B1)).

In the barrier synchronization processing (BARRIER(B1)) after the CPU CPU#1 finishes the loop process of its own, the CPU CPU#1 increments BARW [1] of its own by one (in other words, inverts BARW [1]) in accordance with an instruction "inc r1[1]". The CPU CPU#0 is a master CPU, and, after finishing the loop process of its own, CPU#0 checks whether BARW [1] of CPU#1 is inverted or not in accordance with an instruction "check r1[1]". If CPU#1 is inverted, CPU#0 increments BARW [1] of its own by one (inverts BARW [1]), and CPU#1 detects the inversion of BARW [1] of CPU#0 in accordance with an instruction "check r0[1]". Thus, the barrier synchronization processing (BARRIER (B1)) is completed. Also, the CPUs CPU#2 and CPU#3 similarly carry out a barrier synchronization processing (BARRIER(B2)), for example, by using the CPU CPU#2 as a master CPU.

Then, the CPUs CPU#0 to CPU#3 carry out a barrier synchronization processing (BARRIER(B3)). In the barrier synchronization processing (BARRIER(B3)), the CPU CPU#1 increments BARW [0] of its own by one (inverts BARW [0]) in accordance with an instruction "inc r1[0]", and, similarly, the CPUs CPU#2 and CPU#3 also invert BARW [0] of their own in accordance with an instruction "inc r2[0]" and an instruction "inc r3[0]", respectively. The CPU CPU#0 serving as the master CPU checks whether BARW [0] is inverted by the CPUs CPU#1 to CPU#3 in accordance with an instruction "check r1[0]", an instruction "check r2[0]", and an instruction "check r3[0]". If all of them are inverted, the CPU CPU#0 increments BARW [0] of its own by one (inverts BARW [0]), and the CPUs CPU#L to CPU#3 detects the inversion of BARW [0] of the CPU CPU#0 in accordance with an instruction "check r0[0]". Thus, the barrier synchronization processing (BARRIER(B3)) is completed.

Therefore, in such a case of four CPUs, for example, the CPU CPU#0 is supposed to be able to read the values of BARW of the CPUs CPU#1 to CPU#3, CPU#1 is supposed to be able to read the value of BARW of CPU#0, CPU#2 is supposed to be able to read the value of BARW of CPU#3 and CPU#0, and CPU#3 is supposed to be able to read the value of BARW of CPU#2 and CPU#0. Also, in the case where it is enhanced to comprise eight CPUs, for example, the CPU CPU#0 is supposed to be able to read the value of BARW of the CPUs CPU#1 to CPU#7, CPU#1 is supposed to be able to read the value of BARW of CPU#0, CPU#2 is supposed to be able to read the value of BARW of CPU#3 and CPU#0, and CPU#3 is supposed to be able to read the values of BARW of CPU#2 and CPU#0. Furthermore, the CPU CPU#4 is supposed to be able to read the values of BARW of the CPUs CPU#5 to CPU#7 and the CPU CPU#0, CPU#5 is supposed to be able to read the values of BARW of CPU#4 and CPU#0, CPU#6 is supposed to be able to read the values of BARW of CPU#7, CPU#4 and CPU#0, and CPU#7 is supposed to be able to read the values of BARW of the CPUs CPU#6, CPU#4, and CPU#0. Therefore, the number of bits of BARR can be correspondingly reduced.

As described above, when the multiprocessor system of the fourth embodiment is used, in addition to the various effects described in the foregoing embodiments, further, processing contents (threads) of the CPUs containing multi-layer barrier synchronization processing can be also readily handled. Particularly, it is conceived that such a plural-layer barrier synchronization processing is necessary as the number of the CPUs is increased; and, in that case, advantageous effects can be obtained by using the multiprocessor system of the fourth embodiment.

Fifth Embodiment

Figure 16:
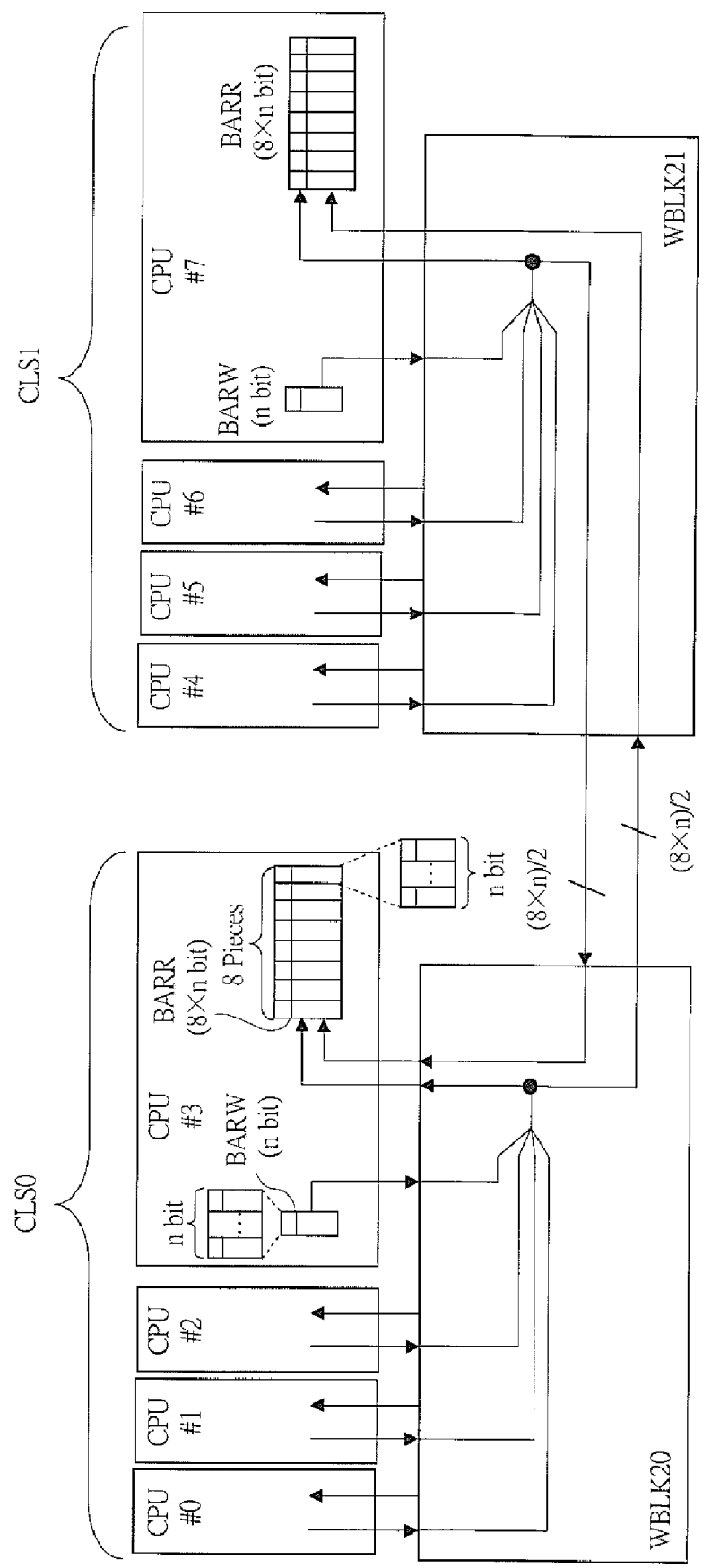
FIG. 16 is a schematic diagram showing a configuration example of a main part of a multiprocessor system according to a fifth embodiment of the present invention.

FIG. 16 is a schematic diagram showing a configuration example of a main part of a multiprocessor system according to a fifth embodiment of the present invention. In comparison with the configuration example of FIG. 2 described in the first embodiment, the multiprocessor system shown in FIG. 16 has a feature that the number of bits of the barrier write register BARW in each of the CPUs CPU#0 to CPU#7 is n-bit (n>2) and that the number of bits of the barrier read register BARR is (8×n)-bit. More specifically, this configuration example enables setting of a number (version number) in BARW. In addition, correspondingly, the number of wiring lines directed from a wiring block WBLK20 for the cluster CLS0 toward a wiring block WBLK21 for the cluster CLS1 and the number of wiring lines directed from WBLK21 to WBLK20 are ((8×n)/2), respectively. Furthermore, for example in WBLK20 and WBLK21, the n bits of BARW in each of the CPUs CPU#0 to CPU#7 are wired to the corresponding part of n bits in BARR by broadcasting; therefore, although it is not clearly shown, the number of wiring lines is increased compared with FIG. 2. Note that, in FIG. 11, CPU#0, CPU#1, and CPU#2 have a same configuration with CPU#3; and CPU#4, CPU#5, and CPU#6 have a same configuration with CPU#7. Since the other configuration is similar to the case of FIG. 16, detailed descriptions thereof will be omitted.

Figure 17:
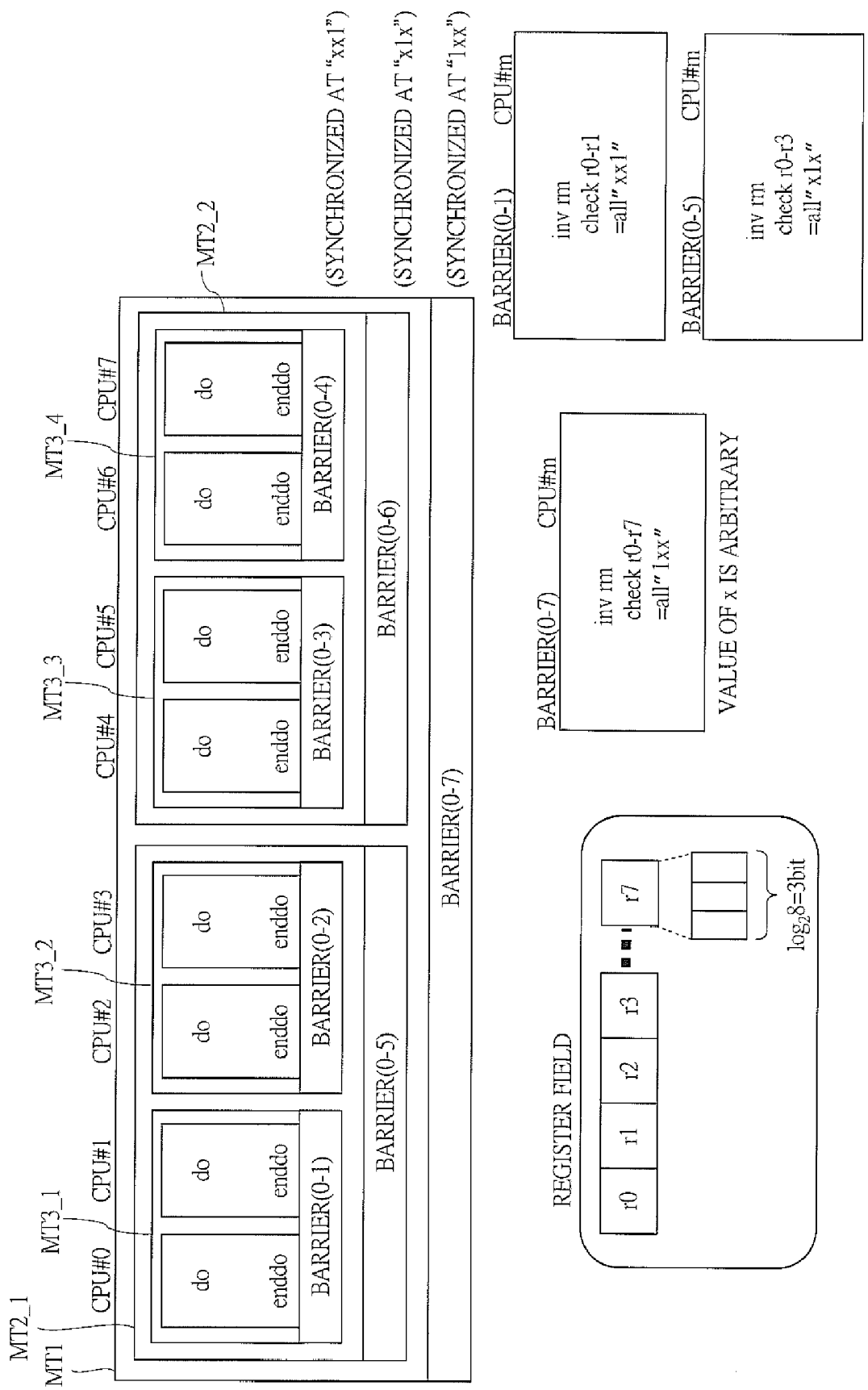
FIG. 17 is an explanatory diagram showing an example of an operation of the multiprocessor system of FIG. 16.

FIG. 17 is an explanatory diagram showing an example of an operation of the multiprocessor system of FIG. 16. In FIG. 17, as well as the case of FIG. 12 described in the fourth embodiment, processing contents comprising the first-layer loop process MT1, the second-layer loop processes MT2_1 and MT2_2, and the third-layer loop processes MT3_1 to MT3_4 are allocated to the CPUs CPU#0 to CPU#7. In the example of FIG. 12, the processes corresponding to the three layers are realized by using different sets of BARW and BARR, respectively; however, in the example of FIG. 17, the processes corresponding to the three layers are realized by using different bits in BARW and BARR, respectively. More specifically, in FIG. 16, "n" is assumed to be 3, and each of the bits of BARW is caused to correspond to one layer.

In FIG. 17, the CPUs CPU#0 and CPU#1 carry out predetermined loop processes and then carry out the barrier synchronization processing (BARRIER(0-1)). Similarly, the CPUs CPU#2 and CPU#3, the CPUs CPU#4 and CPU#5, and the CPUs CPU#6 and CPU#7 also carry out predetermined loop processes and then carry out the barrier synchronization processings (BARRIER(0-2)), (BARRIER(0-3)), and (BARRIER(0-4)), respectively. These barrier synchronization processings of a third layer are carried out by using the situation that "xx1 (x is an arbitrary value)" is set in the n bits (3 bits) of BARW as a synchronization point.

More specifically, for example, in the barrier synchronization processing (BARRIER(0-1)), after finishing the loop process of its own, first of all, each of the CPUs CPU#0 and CPU#1 inverts a particular one bit (herein, a bit at the right end) among the 3 bits in BARW of its own in accordance with an instruction "inv rm". When the bit is inverted, each of the 3-bit values of the register fields corresponding to CPU#0 and CPU#1 in BARR of each of the CPUs CPU#0 to CPU#7 (corresponding to r0 and r1) is caused to be "xx1" via the wiring blocks WBLK. Then, in accordance with an instruction "check r0-r1=all"xx1"", each of the CPU CPU#0 and the CPU CPU#1 rendezvouses until both the 3-bit values of the register fields corresponding to CPU#0 and CPU#1 in BARR (corresponding to r0 and r1) become "xx1". Then, at the point when both r0 and r1 become "xx1", the barrier synchronization processing (BARRIER(0-1)) is completed.

After the barrier synchronization processings of the third layer is carried out in this manner, a barrier synchronization processing of a second layer is carried out. More specifically, the CPUs CPU#0 to CPU#3 carry out a barrier synchronization processing (BARRIER(0-5)), and the CPUs CPU#4 to CPU#7 carry out a barrier synchronization processing (BARRIER(0-6)). The barrier synchronization processing of the second layer uses the situation that "x1x" is set in the n bits (3 bits) of BARW as a synchronization point.

For example, in the barrier synchronization processing (BARRIER(0-5)), first of all, each of the CPUs CPU#0 to CPU#3 inverts a particular one bit (herein, a middle bit) in the 3 bits in BARW of its own in accordance with an instruction "inv rm". When this inversion accompanying the second layer is carried out, the 3-bit value in the register fields corresponding to the CPUs CPU#0 to CPU#3 in BARR of each of the CPUs CPU#0 to CPU#7 (corresponding to r0 to r3) is caused to be "x1x". Then, in accordance with an instruction "check r0-r3=all"x1x"", the CPUs CPU#0 to CPU#3 rendezvous until all the 3-bit values of the register fields corresponding to the CPUs CPU#0 to CPU#7 in BARR (corresponding to r0 to r3) become "x1x" Then, at the point when all of r0 to r3 become "x1x", the barrier synchronization processing (BARRIER(0-5)) is completed.

After the barrier synchronization processings of the second layer is carried out in this manner, a barrier synchronization processing of a first layer is carried out. More specifically, the CPUs CPU#0 to CPU#7 carry out a barrier synchronization processing (BARRIER(0-7)). In the barrier synchronization processing of the first layer, the situation that "1xx" is set in the n-bit (3 bits) of BARW is used as a synchronization point.

In the barrier synchronization processing (BARRIER(0-7)), first of all, each of the CPUs CPU#0 to CPU#7 inverts a particular one bit (herein, a left-end bit) in the 3 bits in BARW of its own in accordance with an instruction "inv rm". When the inversion accompanying the first layer is carried out, each of the 3-bit values of the register fields corresponding to the CPUs CPU#0 to CPU#7 in BARR of each of the CPUs CPU#0 to CPU#7 (corresponding to r0 to r7) becomes "1xx". Then, in accordance with an instruction "check r0-r7=all"1xx"", the CPUs CPU#0 to CPU#7 rendezvous until all the 3-bit values of the register fields corresponding to the CPUs CPU#0 to CPU#7 in BARR (corresponding to r0 to r7) become "1xx". Then, at the point when all of r0 to r7 become "1xx", the barrier synchronization processing (BARRIER(0-7)) is completed.

Note that, although not illustrated, in the case where, for example, barrier synchronization processing is to be carried out again by using the right-end bit in the 3 bits of BARW in a process thereafter, since the corresponding bit of BARW has been already caused to be '1' in the abovedescribed barrier synchronization processing of the third layer, the situation that "xx0 (x is an arbitrary value)" is set in the 3 bits of BARW is used as a synchronization point this time. Consequently, as described in the first embodiment, the resetting operation of returning the inverted bits to the original state can be omitted, and the speed can be increased.

Figure 18:
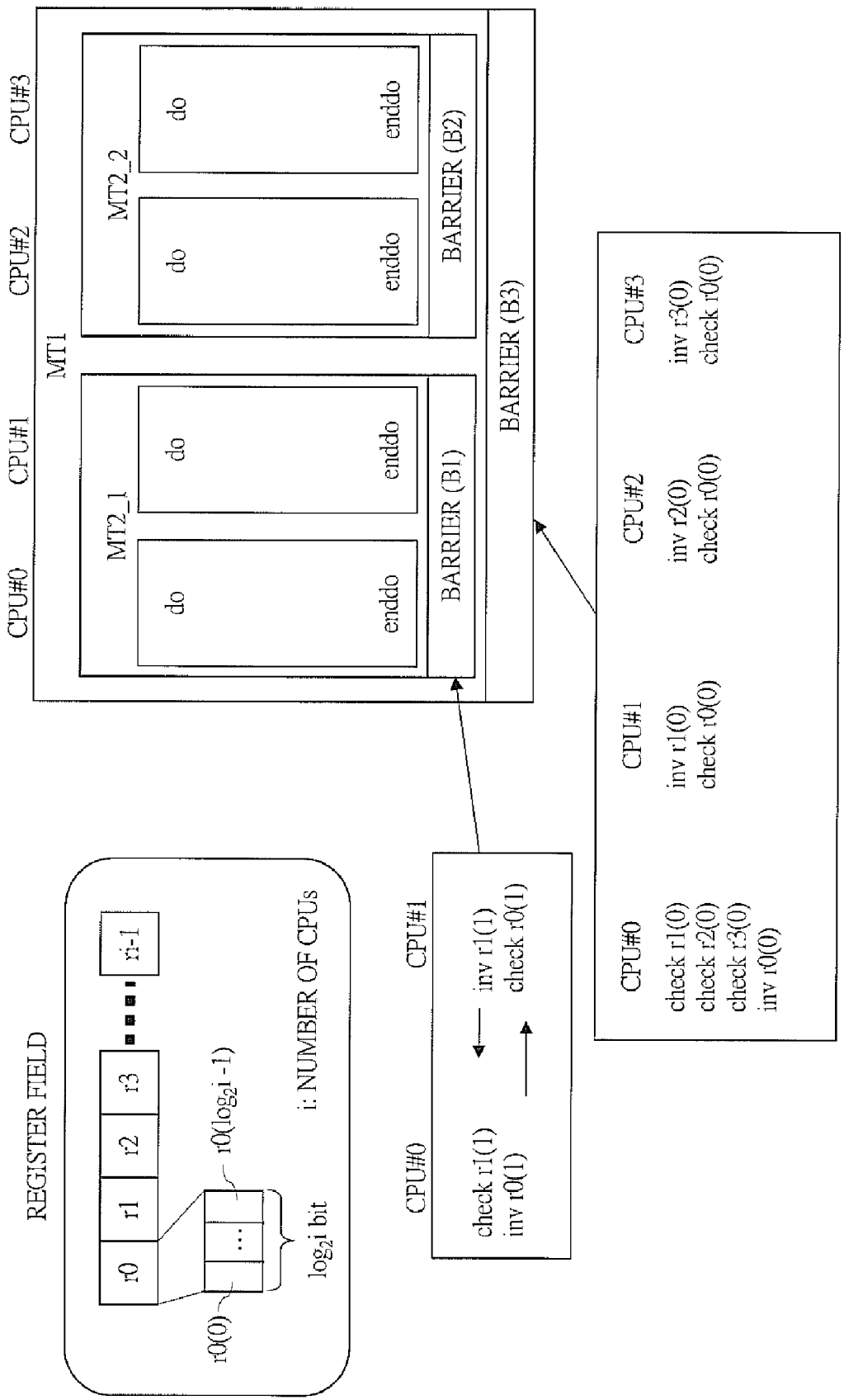
FIG. 18 is an explanatory diagram showing another example of an operation of the multiprocessor system of FIG. 16.

FIG. 18 is an explanatory diagram showing another example of the operation of the multiprocessor system of FIG. 16. FIG. 18 shows an operation example in the case where a master CPU is defined as described in the third embodiment. Herein, the explanation will be given by taking the case where the number of CPUs is four as an example. In FIG. 18, a first-layer loop process MT1 executed by the CPUs CPU#0 to CPU#3 includes a second-layer loop process MT2_1 to be executed by the CPUs CPU#0 and CPU#1 and a second-layer loop process MT2_2 to be executed by the CPUs CPU#2 and CPU#3. In the case where the number of CPUs is four, a register field comprises r0 to r3, and each of R0 to r3 contains 2 bits ($\log_2 4$) therein.

After finishing predetermined loop processes, the CPUs CPU#0 and CPU#1 carry out a second-layer barrier synchronization processing (BARRIER(B1)). In the barrier synchronization processing (BARRIER(B1)) first of all, after finishing the predetermined loop process, the CPU CPU#L inverts either one bit of the 2 bits of BARW of its own in accordance with an instruction "inv r1(1)". The CPU CPU#0 is a master CPU and, after finishing a predetermined loop process, CPU#0 checks whether abovedescribed bit inversion of BARW has been carried out by CPU#1 in accordance with an instruction "check r1(1)". If the bit is inverted, the CPU CPU#0 inverts either one bit of the 2 bits in BARW of its own in accordance with an instruction "inv r0(1)". Then, at the point when the CPU CPU#1 detects the bit inversion operation of BARW by the CPU CPU#0 in accordance with an instruction "check r0(1)", the barrier synchronization processing (BARRIER(B1)) is completed. Also, the CPUs CPU#2 and CPU#3 similarly carry out a second-layer barrier synchronization processing (BARRIER(B2)).

When the second-layer barrier synchronization processing is completed, the CPUs CPU#0 to CPU#3 carry out first-layer barrier synchronization processing (BARRIER(B3)). In the barrier synchronization processing (BARRIER(B3)), the CPU CPU#1 inverts the other bit of the 2 bits of BARW of its own in accordance with an instruction "inv r1(0)", and, similarly, the CPU CPU#2 and the CPU CPU#3 also invert the other bit in the 2 bits of BARW of their own in accordance with an instruction "inv r2(0)" and an instruction "inv r3(0)", respectively. The CPU CPU#0 serving as the master CPU checks whether each of the CPUs CPU#1 to CPU#3 has inverted the other bit in the 2 bits of BARW or not in accordance with an instruction "check r1(0)", an instruction "check r2(0)", and an instruction "check r3(0)". When all of these have been inverted, the CPU CPU#0 inverts the other bit in the 2 bits of BARW of its own; and the CPUs CPU#1 to CPU#3 detect the bit inversion operation of BARW by the CPU CPU#0 in accordance with an instruction "check r0(0)". Thus, the barrier synchronization processing (BARRIER (B3)) is completed.

FIG. 19 is an explanatory diagram showing an example of detailed source codes used in the barrier synchronization processing (BARRIER(B1)) in the operation example of FIG. 18. In FIG. 19, the CPU CPU#1 carries out an EXOR operation of a variable "ver" and "1" and assigns the value of "ver" obtained as a result to a variable "r1". More specifically, if the value of "ver" is "00", "01" is assigned to "r1" via the EXOR operation, and, if, reversely, the value of "ver" is "01" "00" is assigned to "r1" via the EXOR operation. This corresponds to the instruction "inv r1(1)" in FIG. 18.

On the other hand, the CPU CPU#0 also carries out an EXOR operation of the variable "ver" and "1" and assigns the result to "ver". Then, in accordance with a "while" sentence, the CPU CPU#0 waits until the value of "ver" which is the EXOR operation result and the value of "r1" obtained by the CPU CPU#1 match. More specifically, for example, the value of "ver"="01" obtained by the operation of the CPU CPU#0 is set as an expected value, and the situation that the CPU CPU#1 sets "01" as "r1" is waited for. This corresponds to the instruction "check r1(1)" in FIG. 18. When the CPU CPU#1 sets "01" as "r1" the CPU CPU#0 gets out of the "while" sentence and sets the value of "ver" as the variable "r0". More specifically, for example, CPU#0 sets "01" as "r0". On the other hand, the CPU CPU#1 waits for the situation that "01" is set as "r0" by using a "while" sentence; and, when this set operation is detected, barrier synchronization is completed.

When the multiprocessor system of the fifth embodiment described above is used, in addition to the various effects described in the foregoing embodiments, furthermore, processing contents (threads) of the CPUs including multi-layer barrier synchronization processing can be readily handled. Particularly, it is conceived that the multi-layer barrier synchronization processing becomes necessary along with increase of the number of CPUs, and, in that case, advantageous effects can be obtained by using the multiprocessor system of the present fifth embodiment. In FIG. 16, the barrier write register BARW and the barrier read register BARR are different registers; however, as a matter of course, as shown in FIG. 7 of the second embodiment, they can be provided as an integrated one register BAR.

Sixth Embodiment

Figure 20:
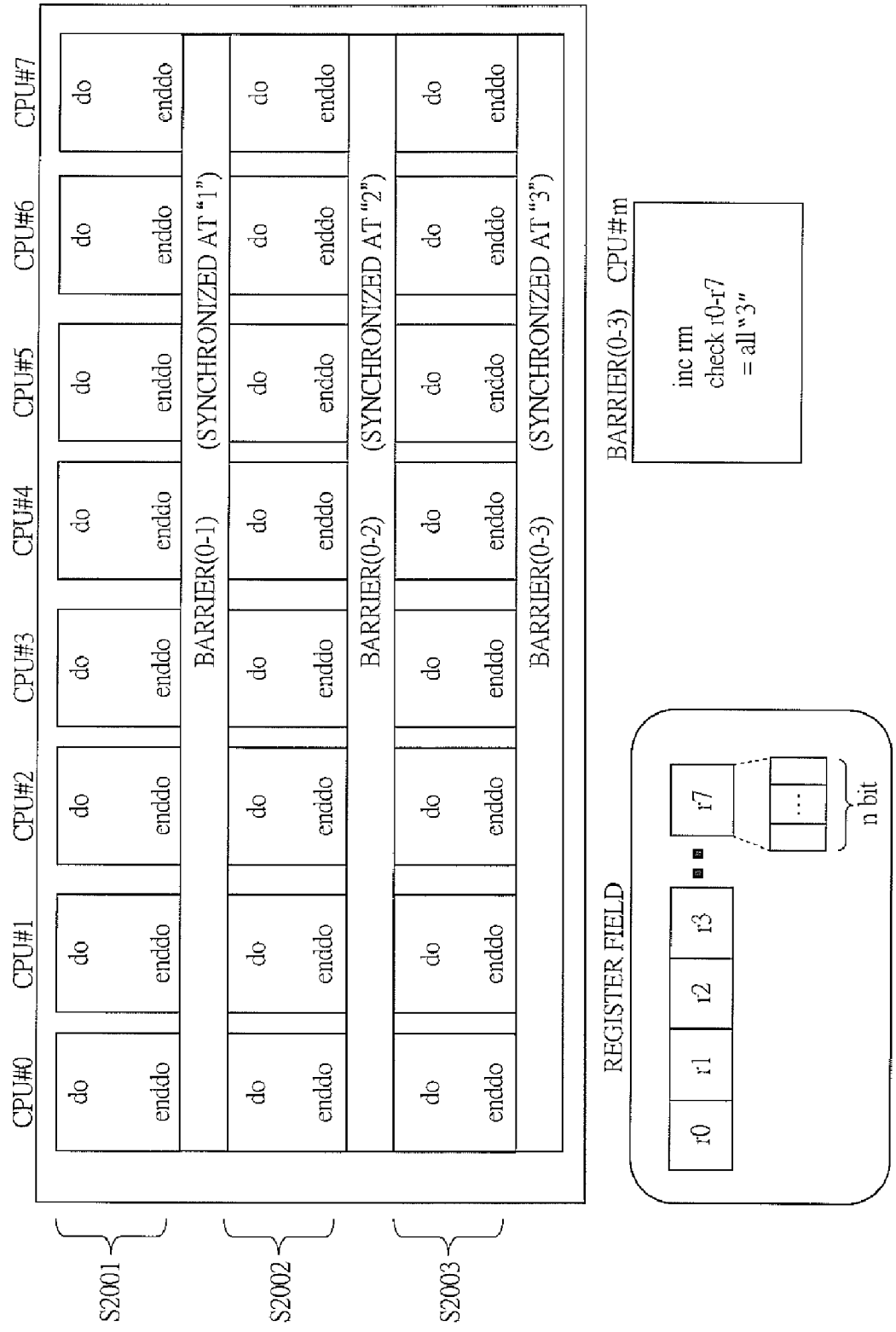
FIG. 20 is an explanatory diagram showing an example of another operation using the configuration example of FIG. 16 in a multiprocessor system according to a sixth embodiment of the present invention.

FIG. 20 is an explanatory diagram showing an example of another operation using the configuration example of FIG. 16 in a multiprocessor system according to a sixth embodiment of the present invention. Herein, the operation example of the case where the n bits (i.e., version number) of the barrier write register BARW, etc. in FIG. 16 are utilized other than the use for separating layers as described in the fifth embodiment is shown.

In FIG. 20, the CPUs CPU#0 to CPU#7 carry out predetermined processes (S2001) and then carry out a barrier synchronization processing (BARRIER(0-1)) while using '1' as a synchronization point. Then, after carrying out predetermined processes (S2002), they carry out a barrier synchronization processing (BARRIER(0-2)) while using '2' as a synchronization point this time. Then, after carrying out predetermined processes (S2003), they carry out barrier synchronization processing (BARRIER(0-3)) while using '3' as a synchronization point this time. In this manner, for example, the number of times of carrying out barrier synchronization processings, etc. can be managed.

For example, in the barrier synchronization processing (BARRIER(0-3)), each of the CPUs CPU#0 to CPU#7 increments the value of BARW of its own by one in accordance with an instruction "inc rm" and then waits for the situation that all the values of BARW of the CPUs CPU#0 to CPU#7 become '3' in accordance with an instruction "check r0-r7=all '3'". In FIG. 16, for example, if the n bit of BARW, etc. is 2 bit, version numbers of '0' to '3' can be used. In this case, after '3' in FIG. 20, the barrier synchronization processing is carried out by returning to '0' again. When such an operation is used, the operation of resetting the version number as described in the first embodiment is not carried out; therefore, the speed can be increased.

In addition, when such version numbers are used, complex barrier synchronization processing can be flexibly handled. For example, when the version numbers are specified by immediate value, a certain CPU and another CPU can be synchronized by the version number '1', and a certain CPU and further another CPU can be synchronized by the version number '2'. In this case, by managing the synchronization by the version numbers, synchronization processing can be readily carried out compared with the case where merely 1-bit information is used.

Figure 21:
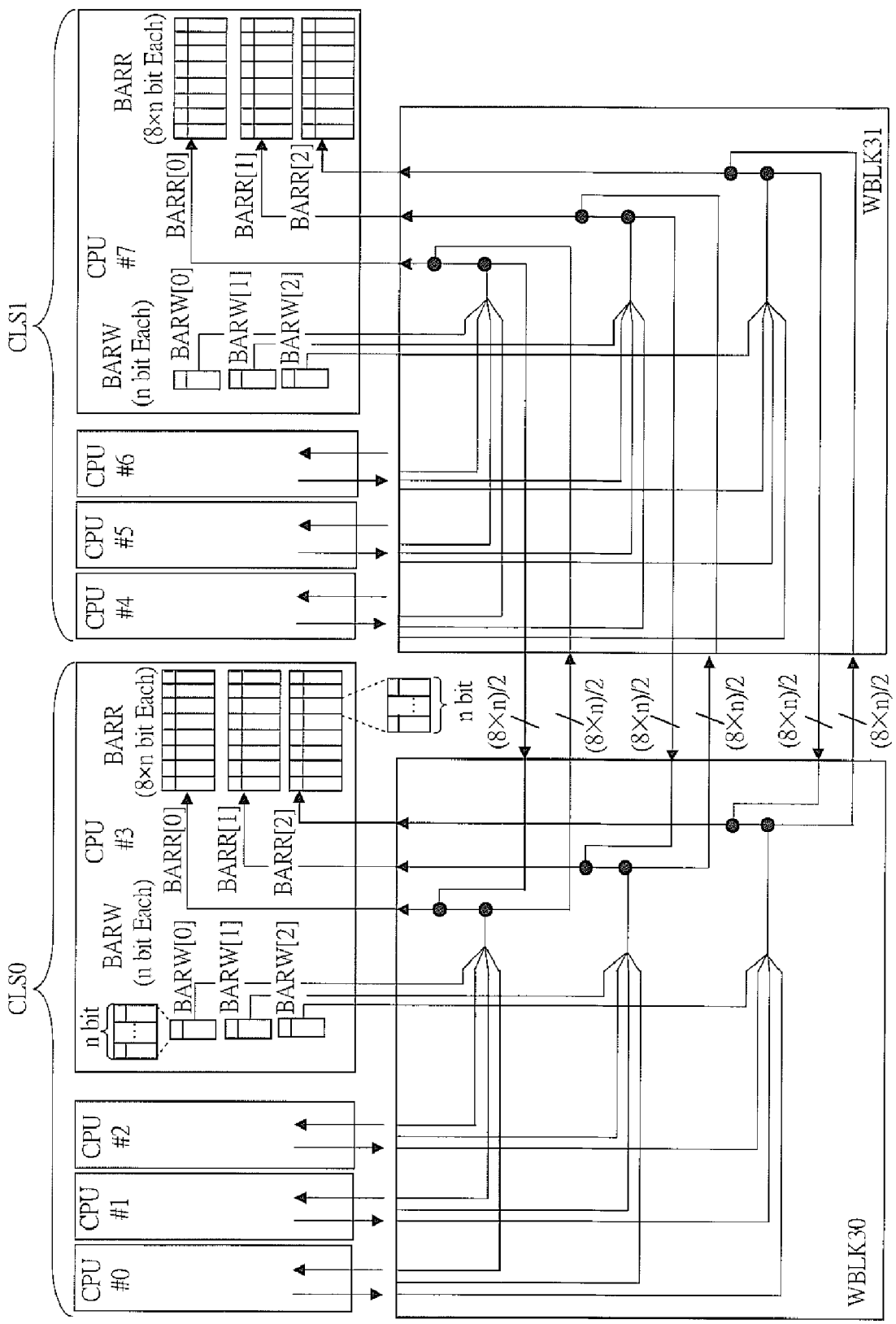
FIG. 21 is a schematic diagram showing a configuration example of a main part of a multiprocessor system according to a seventh embodiment of the present invention.

FIG. 21 is a schematic diagram showing a configuration example of a main part of a multiprocessor system according to a seventh embodiment of the present invention. In comparison with the configuration example of FIG. 11 described in the fourth embodiment, the multiprocessor system shown in FIG. 21 has a feature that the number of bits of each of barrier write registers BARW [0], [1], and [2] in each of the CPUs CPU#0 to CPU#7 is n-bit ($n \geq 2$) and that the number of bits of each of barrier read registers BARR [0], [1], and [2] is ($8 \times n$)-bit. More specifically, in this configuration example, in addition to the configuration in which a plurality of sets of BARW and BARR are provided in the manner described in the fourth embodiment, the version numbers as described in the fifth and sixth embodiments can be further set in each set. Note that, in FIG. 21, CPU#0, CPU#1, and CPU#2 have a same configuration with CPU#3; and CPU#4, CPU#5, and CPU#6 have a same configuration with CPU#7.

When such a configuration is used, a plurality of layers can be handled in accordance with the number of the sets as described in the fourth embodiment, and, furthermore, a plurality of layers can be handled in accordance with the number of bits of the version numbers as described in the fifth embodiment; therefore, even the case where there are more than three layers can be handled by the combinations thereof. More specifically, for example, even the case where loop processes of a fourth layer comprising the CPU CPU#0 and the CPU CPU#2 are added to FIG. 12 can be handled.

Figure 22:
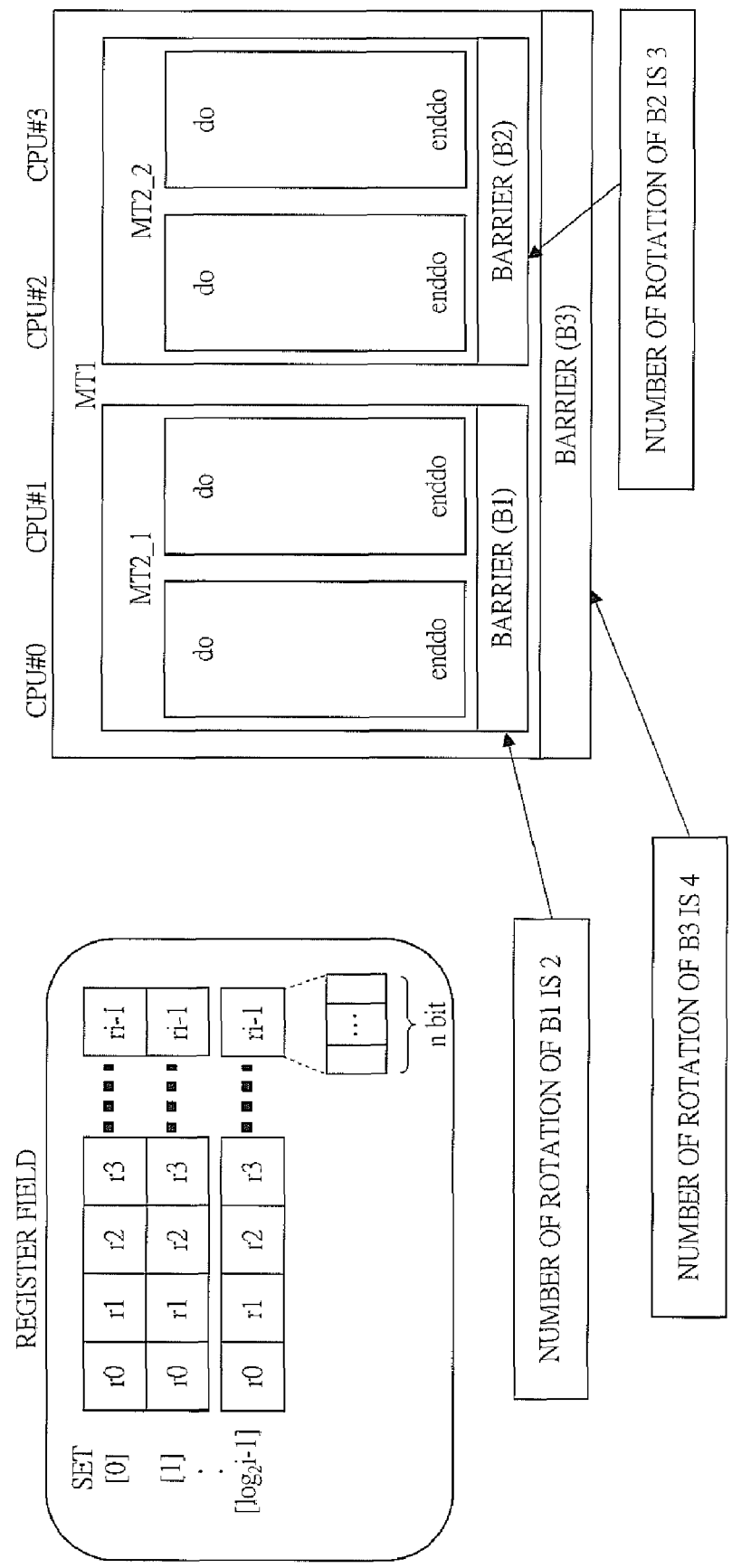
FIG. 22 is an explanatory diagram showing an example of use of the multiprocessor system of FIG. 21.

FIG. 22 is an explanatory diagram showing an example of a use of the multiprocessor system of FIG. 21. Herein, the case where the number of CPUs is four is taken as an example to give descriptions. In FIG. 22, a loop process MT1 of a first layer executed by the CPUs CPU#0 to CPU#3 includes a loop process MT2_1 of a second layer executed by the CPUs CPU#0 and CPU#1 and a loop process MT2_2 of the second layer to be executed by the CPUs CPU#2 and CPU#3. After finishing predetermined loop processes, the CPUs CPU#0 and CPU#1 carry out a barrier synchronization processing (BARRIER(B1)) of the second layer; and, after finishing predetermined loop processes, the CPUs CPU#2 and CPU#3 also carry out a barrier synchronization processing (BARRIER(B2)) of the second layer. Then, after the barrier synchronization processing of the second layer is finished, the CPUs CPU#0 to CPU#3 carry out a barrier synchronization processing (BARRIER(B3)) of the first layer.

When the number of the CPUs is four like this case, corresponding to the two layers, for example, two sets of BARW and BARR are provided. Each of the sets is configured so that a version number of n bits ($n \geq 2$) can be set in BARW, etc. contained in each CPU. In this case, as shown in FIG. 22, with respect to the loop processes MT1, MT2_1, and MT2_2 of the layers, the number of rotations of each of the loop processes can be managed by using the version numbers. For example, an operation of getting out of MT2_1 at the point when the barrier synchronization processing (BARRIER(B1)) is carried out twice (in other words, the loop process MT2_1 is rotated two times), getting out of MT2_2 at the point when the loop process MT2_2 is rotated three times, and getting out of MT1 at the point when the loop process MT1 is rotated four times can be carried out.

Moreover, when the version number is updated every time the loop process is rotated, for example, the version number can be also used as a stopping condition of a break point in program debugging. Furthermore, for example, it can be also utilized when dynamic extraction etc. of a hotspot is carried out. For example, a further advanced barrier synchronization processing can be handled by, instead of using the version numbers, for example, increasing the number of sets by the amount corresponding to that or, reversely, causing the number of sets to be one and increasing the number of bits of the version numbers by the amount corresponding to that. However, in this case, for example, readability of a program may be lowered, and, from this point of view, the configuration using the sets and the version numbers in combination is desired.

When the multiprocessor system of the seventh embodiment described above is used, in addition to the various effects described in the above embodiments, furthermore, the case of carrying out more complex or advanced barrier synchronization processing can be flexibly handled. Particularly, it is conceived that further advanced barrier synchronization processing is required along with increase of the number of CPUs, and in that case, advantageous effects can be obtained by using the multiprocessor system of the seventh embodiment.

In the foregoing, the invention made by the inventors of the present invention has been concretely described based on the embodiments. However, it is needless to say that the present invention is not limited to the foregoing embodiments and various modifications and alterations can be made within the scope of the present invention.

The multiprocessor system according to an embodiment of the present invention is a technique advantageously applied to, although not limited thereto, a system for a field in which the hardware cost or development period is greatly limited such as a system for an embedding use, and can be widely applied to general multiprocessor systems.

What is claimed is:

1. A multiprocessor system comprising:
N (N≧2) number of processors;
N number of barrier write registers provided in the N processors, respectively;
N number of barrier read registers provided in the N processors, respectively; and
a wiring block directly connecting the N barrier write registers to the N barrier read registers, wherein,
when any one processor of the N processors writes first information to the barrier write register provided in the same processor along with a barrier synchronization, the wiring block transmits the first information to the barrier read register provided in at least one other of said processors via a direct wiring connection, and
said at least one other processor is configured to detect the first information via the barrier read register provided in said at least one other processor.

2. The multiprocessor system according to claim 1, wherein
each of the N barrier write registers is a 1-bit register.

3. The multiprocessor system according to claim 2, wherein each of the N barrier read registers is an N-bit register, and
wherein the wiring block cconnects, in a broadcasting manner, each of the N barrier write registers to a corresponding particular one bit of the N bits comprising each of the N barrier read registers, and also connects, in a broadcasting manner, each of the other N barrier write registers to corresponding other particular one bits among the N bits comprising each of the N barrier read registers.

4. The multiprocessor system according to claim 3, wherein
the barrier write register provided in each of the N processors is implemented using, in combination, one bit among the N bits of the barrier read register provided in the same processor.

5. The multiprocessor system according to claim 2, wherein,
a first barrier read register contained in a first one of said N processors is a register of (N-1)-bits or larger;
each of the (N-1) number of barrier read registers, other than the first barrier read register, is a 1-bit register; and
the wiring block connects the (N-1) barrier write registers contained in the processors other than the first processor to the (N-1) bits of the first barrier read register, respectively, and connects, in a broadcasting manner, the barrier write register contained in the first processor to the (N-1) barrier read registers other than the first barrier read register.

6. The multiprocessor system according to claim 1 further comprising:
a system bus commonly connected to the N processors; and
a memory connected to the system bus and commonly accessed by the N processors.

7. The multiprocessor system according to claim 1, wherein
each of the N barrier write registers and each of the N barrier read registers is an address-mapped register.

8. The multiprocessor system according to claim 1, wherein
the N processors are divided into a plurality of clusters;
a plurality of the wiring blocks is provided in correspondence with the plurality of clusters, respectively; and
each of the plurality of wiring blocks connects the barrier write register contained in the cluster of the same wiring block to the barrier read register contained in the cluster of the wiring block, and extends wiring from the barrier write register contained in the cluster of the same wiring block to the cluster of another wiring block, and connects wiring from the barrier write register extended from the cluster of the another wiring block and contained in the cluster of the another wiring block to the barrier read register contained in the cluster of the same wiring block.

9. A multiprocessor system comprising:
N (N≧2) number of processors;
(M×N) number of barrier write registers in which M (M≧2) number of sets of the barrier write registers are provided in each of the N processors;
(M×N) number of barrier read registers in which M number of sets of the barrier read registers are provided in each of the N processors; and
a wiring block directly connecting each of the (M×N) barrier write registers to one of the (M×N) barrier read registers, wherein,
when any processor among the N processors writes first information to the barrier write register of a K-th (K≦M) set provided in the same processor along with barrier synchronization, the wiring block transmits the first information to the barrier read register of the K-th set provided in at least one other of said processors via a direct wiring connection; and said at least one other processor is configured to detect the first information via the barrier read register of the K-th set provided in said at least one other processor.

10. The multiprocessor system according to claim 9, wherein
each of the (M×N) barrier write registers is a 1-bit register.

11. The multiprocessor system according to claim 10, wherein each of the (M×N) barrier read registers is an N-bit register, and
wherein the wiring block connects, in a broadcasting manner, the barrier write register of the K-th set provided in a first processor of the N processors to a particular one bit of the N bits comprising the barrier read register of the K-th set provided in said at least one other processor, and connects, in a broadcasting manner, the barrier write register of the K-th set provided in a second processor, which is another one of the N processors, to a particular one bit of the N bits comprising the barrier read register of the K-th set provided in said at least one other processor other than the second processor.

12. The multiprocessor system according to claim 11, wherein
the barrier write register of the K-th set provided in each of the N processors is implemented using, in combination, one bit of the N bits of the barrier read register of the K-th set provided in the same processor.

13. The multiprocessor system according to claim 9 further comprising:
a system bus commonly connected to the N processors; and
a memory connected to the system bus and commonly accessed by the N processors.

14. The multiprocessor system according to claim 9, wherein each of the (M×N) barrier write registers and each of the (M×N) barrier read registers is an address-mapped register.

15. The multiprocessor system according to claim 9, wherein the N processors are divided into a plurality of clusters,
wherein a plurality of the wiring blocks is provided in correspondence with the plurality of clusters, respectively, and
wherein each of the plurality of wiring blocks connects the barrier write register contained in the cluster of the same wiring block to the barrier read register contained in the cluster of the same wiring block, and extends wiring from the barrier write register contained in the cluster of the same wiring block to the cluster of at least one other wiring block, and connects wiring from the barrier write register extended from the cluster of said at least one other wiring block and contained in the cluster of said at least one other wiring block to the barrier read register contained in the cluster of the same wiring block.

16. A multiprocessor system comprising:
N (N≧2) number of processors;
(M×N) number of barrier write registers in which M (M≧2) sets of the barrier write registers are provided in each of the N processors;
(M×N) number of barrier read registers in which M sets of the barrier read registers are provided in each of the N processors; and
a first means which, when any processor among the N processors writes first information to the barrier write register of a K-th (K≦M) set provided in the same processor along with barrier synchronization, transmits the first information to the barrier read register of the K-th set provided in at least one other processor via a direct connection wherein said at least one other processor is configured to detect the first information via the barrier read register of the K-th set provided in the at least one other processor.

17. The multiprocessor system according to claim 16, wherein
the first means is implemented by directly wiring the (M×N) barrier write registers to the (M×N) barrier read registers.

18. The multiprocessor system according to claim 16, wherein
each of the (M×N) barrier write registers is a 1-bit register.

19. The multiprocessor system according to claim 16, wherein
each of the (M×N) barrier write registers is a multi-bit register.

20. A multiprocessor system comprising:
N (N≧2) number of processors;
N number of barrier write registers provided in the N processors, respectively;
N number of barrier read registers provided in the N processors, respectively; and
a first means which, when any processor among the N processors writes first information to the barrier write register provided in the same processor along with barrier synchronization, transmits the first information to the barrier read register provided in at least one other processor via a direct connection,
wherein each of the N barrier write registers is a multi-bit register,
wherein a plurality of types can be set in the first information corresponding to a number of bits of the multi-bit registers, and
wherein said at least one other processor is configured to detect the first information via the barrier read register provided in the at least one other processor.

21. The multiprocessor system according to claim 20, wherein the first means is implemented by directly wiring the N barrier write registers to the N barrier read registers.

22. A method of synchronization for a multiprocessor system having N (N≧2) number of processors, the method comprising:
providing N number of barrier write registers provided in the N processors, respectively;
providing N number of barrier read registers provided in the N processors, respectively;
transmitting first information to said barrier read register provided in at least one other processor via a direct connection when any processor among the N processors writes said first information to the barrier write register provided in said processor, along with barrier synchronization;
performing a first process of causing each of the N processors to read the barrier read register provided in the same processor and to determine a synchronization stand-by state of said at least one other processor using a first value as a synchronization point to carry out barrier synchronization processing of the N processors;
performing a second process of causing each of the N processors to invert or increment the barrier write register of the same processor to set a second value in the barrier write register of the same processor after the first process; and
performing a third process of causing each of the N processors to read the barrier read register provided in the same processor and to determine the synchronization stand-by state of said at least one other processor using the second value as a synchronization point to carry out barrier synchronization processing of the N processors after the second process.

23. A method of synchronization for a multiprocessor system using:
- N (N≧2) number of processors including one master processor;
- N number of barrier write registers provided in the N processors, respectively;
- N number of barrier read registers provided in the N processors, respectively; and
- a first means which, when any processor among the N processors writes first information to the barrier write register provided in the same processor along with barrier synchronization, transmits the first information to the barrier read register provided in another processor, and the method executing:
- a first process of causing a master processor to detect, via the barrier read register of the same master processor, a situation that all the processors other than the master processor write the first information to the barrier write registers of the same processors;
- a second process of causing the master processor to write the first information to the barrier write register of the same master processor after the first process; and,
- in parallel with the second process, a third process of causing all the processors other than the master processor to detect, via the barrier read register of the same processor, a situation that the master processor writes the first information to the barrier write register of the master processor.

* * * * *